US006658463B1

(12) United States Patent
Dillon et al.

(10) Patent No.: US 6,658,463 B1
(45) Date of Patent: Dec. 2, 2003

(54) SATELLITE MULTICAST PERFORMANCE ENHANCING MULTICAST HTTP PROXY SYSTEM AND METHOD

(75) Inventors: Douglas M. Dillon, Gaithersburg, MD (US); T. Paul Gaske, Rockville, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/498,936

(22) Filed: Feb. 4, 2000

Related U.S. Application Data

(60) Provisional application No. 60/138,496, filed on Jun. 10, 1999.

(51) Int. Cl.[7] .............................................. G06F 15/16

(52) U.S. Cl. ....................... 709/219; 709/217; 709/203; 709/228

(58) Field of Search ................................ 709/217, 219, 709/202, 203, 204; 707/1, 8, 100, 200, 201

(56) References Cited

U.S. PATENT DOCUMENTS

| | | | | |
|---|---|---|---|---|
| 6,055,364 A | * | 4/2000 | Speakman et al. .......... | 709/229 |
| 6,085,193 A | * | 7/2000 | Malkin et al. ............... | 709/200 |
| 6,128,655 A | * | 10/2000 | Fields et al. ................ | 709/219 |
| 6,463,447 B2 | * | 10/2002 | Marks et al. ............... | 709/228 |

OTHER PUBLICATIONS

"Transparent Power–on Control of Token Ring and Token Bus File Server Computers", IBM Technical Disclosure Bulletin, Mar. 1995, vol. 38, Issue 3, pp. 55–56.*

* cited by examiner

Primary Examiner—David Wiley
Assistant Examiner—Joseph E. Avellino
(74) Attorney, Agent, or Firm—John T. Whelan; Michael Sales

(57) ABSTRACT

A communication system including an upstream proxy server and two reporting downstream proxy servers, where the upstream proxy server is capable of multicasting a uniform resource locator (URL) to the reporting downstream proxy servers, the reporting downstream proxy servers interact with the upstream proxy server to resolve cache misses and the upstream proxy servers returns a resolution to a cache miss via multicast. A downstream proxy server which filters multicast transmissions of URLs and stores a subset of the URLs for subsequent transmission, where relative popularity is used to determine whether to store a multicast URL. An upstream proxy server capable of multicasting URLs to reporting downstream proxy servers, where the upstream proxy server interacts with the two reporting downstream proxy servers to resolve cache misses and the upstream proxy server returns a resolution to the cache misses via multicast. A proxy server protocol which includes a transaction request further including a request header, request content, and a request extension that supports multicast hit reporting and a transaction response further including a response header, response content, and a response extension which supports multicast cache pre-loading. A transaction response header which includes a popularity field indicating the popularity of a global name with respect to other global names and an expiration field indicating an expiration of the global name.

20 Claims, 12 Drawing Sheets

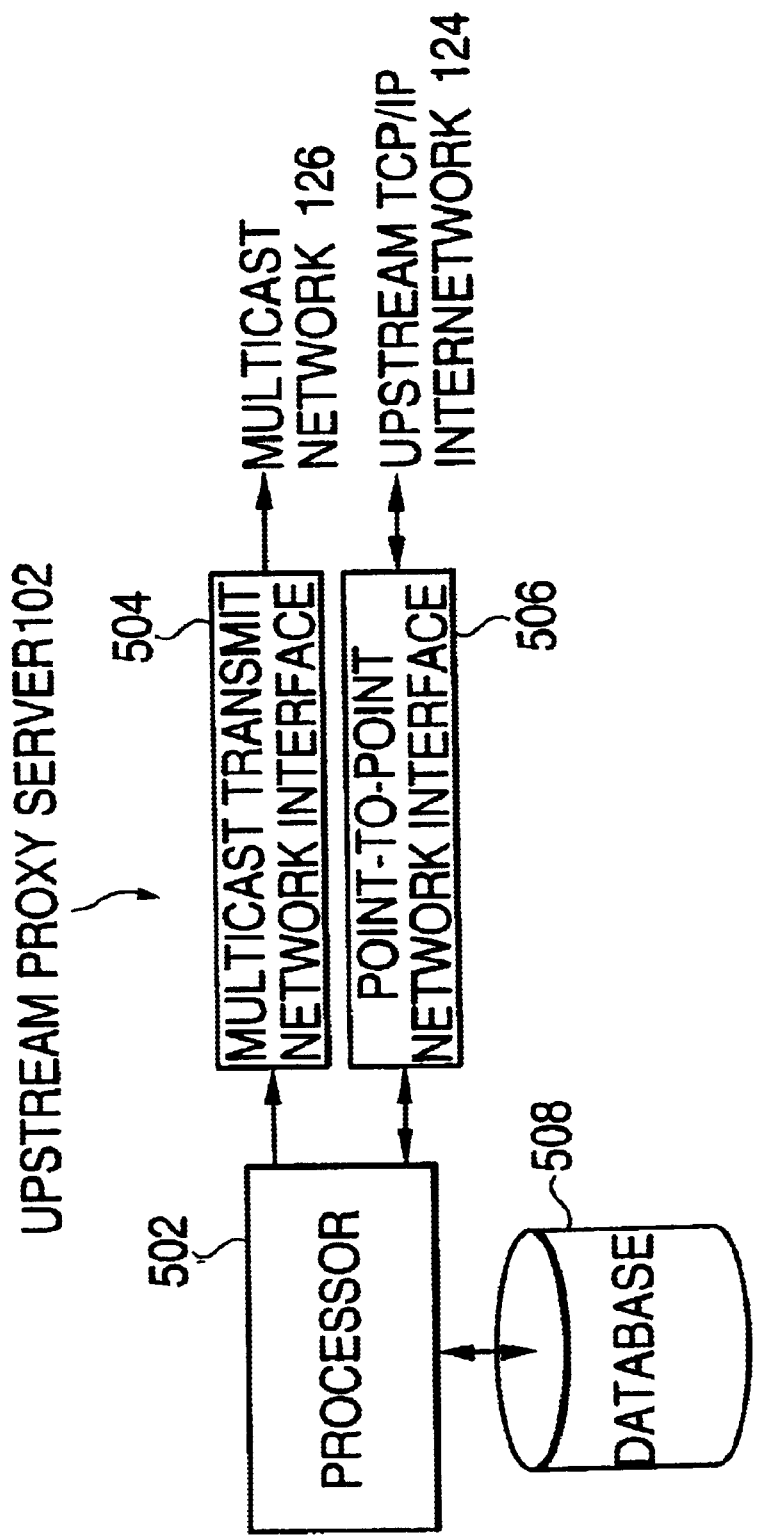

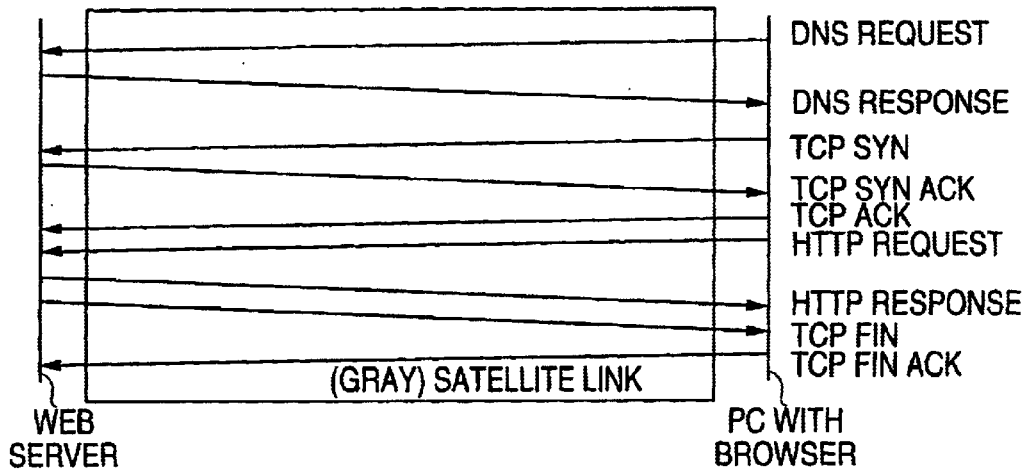
FIG. 6 PACKETS TRAVERSING THE SATELLITE LINK FOR A SINGLE HTTP TRANSACTION WITH HTTP 1.0
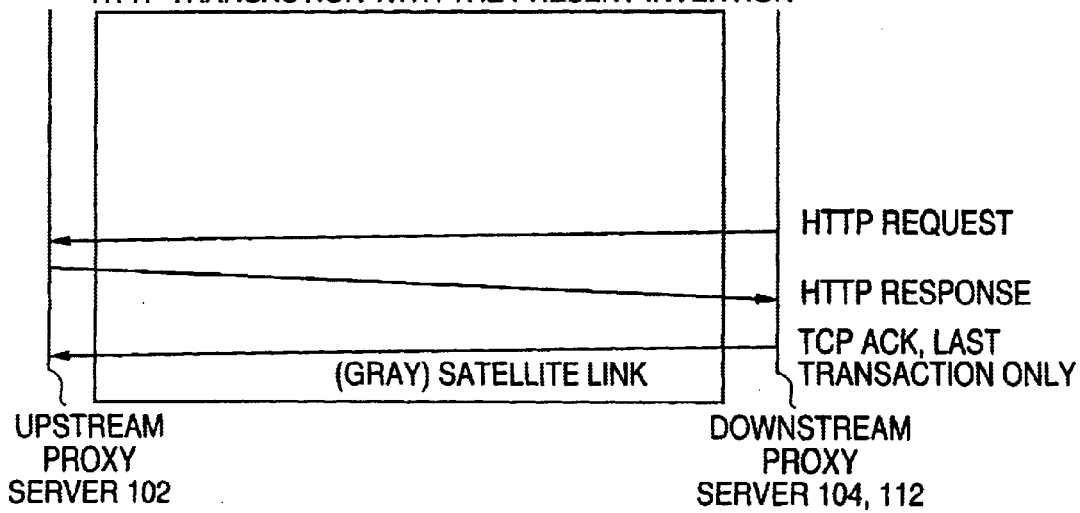
FIG. 7 PACKETS TRAVERSING THE SATELLITE LINK FOR A SINGLE HTTP TRANSACTION WITH THE PRESENT INVENTION

```
GET http://www.yahoo.com/HTTP/1.0
PROXY-CONNECTION: KEEP-ALIVE
USER-AGENT:MOZILLA/4.61 [EN] (WinNT;1)
HOST:www.yahoo.com
ACCEPT: IMAGE/GIF, IMAGE/X-XBITMAP,IMAGE/PEG, IMAGE/PJPEG, IMAGE/PNG,1
ACCEPT-ENCODING:GZIP
ACCEPT-LANGUAGE:EN
ACCEPT-CHARSET: ISO-8859-1,*,utf-8
COOKIE: B    31c61vhar6s
```

FIG. 8

```
HTTP/1.0 200 OK

PROXY-CONNECTION: KEEP-ALIVE
CONNECTION: KEEP-ALIVE
CONTENT-LENGTH: 11831
CONTENT-TYPE: text/html
```

FIG. 9

SATELLITE MULTICAST PERFORMANCE ENHANCING MULTICAST HTTP PROXY SYSTEM AND METHOD

RELATED APPLICATIONS

This application is based on and claims benefit from provisional application entitled "Satellite Multicast Performance Enhancing Multicast HTTP Proxy System and Method" which was filed on Jun. 10, 1999, and respectively accorded Serial No. 60/138,496.

1. BACKGROUND OF THE INVENTION

1.1 Field of the Invention

The present invention relates generally to the distribution of World Wide Web content over a geosynchronous satellite communications network, and in particular, to satellite communications networks having an outbound high-speed, continuous channel carrying packetized data and either a satellite inbound channel or a terrestrial inbound channel, such as a dialup connection to the Internet.

1.2 Description of related Art
1.2.1 Caching HTTP Proxy Servers

The most popular method for distributing multimedia information is the Internet's World Wide Web. The World Wide Web can be considered to be a set of network accessible information resources. In the World Wide Web, many Web Servers and Web Browsers are connected to the Internet via the TCP/IP protocols and the Web Browsers request web pages and graphics and other multimedia content via the Hypertext Transfer Protocol (HTTP).

The World Wide Web is founded on three basic ideas:

1. A global naming scheme for resources—that is, Uniform Resource Locators (URLs).
2. Protocols for accessing named resources—the most common of which is the Hypertext Transfer Protocol (HTTP).
3. Hypertext—the ability to embed links to other resources which is typically done according to the Hypertext Markup Language (HTML).

Web pages are formatted according to the Hypertext Markup Language (HTML) standard which provides for the display of high-quality text (including control over the location, size, color and font for the text), the display of graphics within the page and the "linking" from one page to another, possibly stored on a different web server. Each HTML document, graphic image, video clip or other individual piece of content is identified, that is, addressed, by an Internet address, referred to as a Uniform Resource Locator (URL). In the context of this invention, a "URL" may refer to an address of an individual piece of web content (HTML document, image, sound-clip, video-clip, etc.) or the individual piece of content addressed by the URL. When a distinction is required, the term "URL address" refers to the URL itself while the terms "URL content" or "URL object" refers to the content addressed by the URL.

A web browser may be configured to either access URLs directly from a web server or from an HTTP proxy server. An HTTP proxy server acts as an intermediary between one or more browsers and many web servers. A web browser requests a URL from the proxy server which in turn "gets" the URL from the addressed web server. An HTTP proxy itself may be configured to either access URLs directly from a web server or from another HTTP proxy server. When a proxy server sends a request to another proxy server the proxy server processing the request is referred to as being upstream (that is, closer to the web server). When a proxy server receives a request from another proxy server, the requesting proxy server is referred to as being downstream, that is, farther from the Web Server.

FIG. 1 illustrates a system in which one of a plurality of browsers accesses a web server via upstream and downstream proxy servers with an HTTP GET command. In particular, a plurality of PCs 12, each including a browser 14, output a GET command to web server 16, in order to access the URL "A". Assuming PC 12 and browser 14 make the first request, the GET command is passed to downstream proxy server 18. Since this is the first request for URL "A", the downstream proxy server 18 does not have URL "A" in its cache 20. As a result, the downstream proxy server 18 also issues a GET URL "A" command to upstream proxy server 22. Since this is also the first request to upstream proxy server 22 for the URL "A", the upstream proxy server 22 also does not have URL "A" in its cache 24. Therefore, the upstream proxy server 22 issues a GET URL "A" command directly the web server 16. The web server 16 services this request and provides the upstream proxy server 22 with the desired information, which is then stored in the cache 24. The upstream proxy server 22 passes the desired information to the downstream proxy server 18, which also stores the desired information in its cache 20. Finally, the downstream proxy server 18 passes the desired information to the originating requestor's browser 14 at PC 12, which also stores the desired information in its cache 21.

Subsequently, PC 12', via its browser 14', also desires the information at URL "A". PC 12' issues a GET URL "A" command to downstream proxy server 18. At this time, downstream proxy server 18 has the desired information in its cache 20 and provides the information directly to PC 12' without requesting additional information from either the upstream proxy server 22 or the web server 16. Similarly, if PC 12", via its browser 14", also desires the information at URL "A", PC 12" issues a GET URL "A" command to downstream proxy server 18'. However, since downstream proxy server 18' does not have the information for URL "A" stored in its cache 20', the downstream proxy server 18' must access the upstream proxy server 22 and its cache 24, in order to supply the desired information to PC 12". However, the upstream proxy server 22 does not have to access the web server 16, because the desired information is stored in its cache 24.

As described above, a caching HTTP proxy server, such as downstream proxy servers 18, 18' and upstream proxy server 22 store (cache) some URLs. Normally, a caching proxy server stores the most frequently accessed URLs. When a web server delivers a URL, it may deliver along with the URL an indication of whether the URL should not be cached and an indication of when the URL was last modified. As described in conjunction with FIG. 1, the URLs stored by a caching proxy server are typically URLs obtained on behalf of a browser or downstream proxy server. A caching HTTP proxy server satisfies a request for a URL, when possible, by returning a stored URL. The HTTP protocol also supports a GET IF MODIFIED SINCE request wherein a web server (or a proxy server) either responds with a status code indicating that the URL has not changed or with the URL content if the URL has changed since the requested date and time.

FIG. 2 illustrates a browser executing a GET IF MODIFIED SINCE command from web server 16. As illustrated in FIG. 2, the PC 12, including browser 14, has already requested URL "A" once and has URL "A" stored in its cache 21. PC 12 now wants to know if the information stored at URL "A" has been updated since the time it was last requested. As a result, the browser 14 issues a GET A IF MODIFIED SINCE the last time "A" was obtained. Assuming that URL "A" was obtained at 11:30 a.m. on Jul. 13, 1999, browser 14 issues a GET A IF MODIFIED SINCE Jul. 15, 1999 at 11:30 a.m. request. This request goes to downstream proxy server 18. If downstream proxy server 18 has received an updated version of URL "A" since Jul. 15, 1999 at 11:30 a.m., downstream proxy server 18 will supply the new URL "A" information to the browser 14. If not, the downstream proxy server 18 will issues a GET IF MODIFIED SINCE command to upstream proxy server 22. If upstream proxy server 22 has received an updated URL "A" since Jul. 15, 1999 at 11:30. a.m., upstream proxy server 22 will pass the new URL "A" to the downstream proxy server 18. If not, the upstream proxy server 22 will issue a GET A IF MODIFIED SINCE command to the web server a. If URL "A" has not changed since Jul. 15, 1999 at 11:30 a.m., web server 16 will issue a NO CHANGE response to the upstream proxy server 22. In this way, bandwidth and processing time are saved, since if the URL "A" has not been modified since the last request, the entire contents of URL "A" need not be transferred between web browser 14, downstream proxy server 18, upstream proxy server 22, and the web server 16, only an indication that there has been no change need be exchanged.

Caching proxy servers offer both reduced network utilization and reduced response time when they are able to satisfy requests with cached URLs. Much research has been done attempting to arrive at a near-optimal caching policy, that is, determining when a caching proxy server should store URLs, delete URLs and satisfy requests from the cache both with and without doing a GET IF MODIFIED SINCE request against the web server. Caching proxy servers are available commercially from several companies including Microsoft, Netscape, Network Appliance and Cache Flow.

1.2.2 Satellite Multicast Networks

Typical geosynchronous satellites relay a signal from a single uplink earth station to any number of receivers under the "foot print" of the satellite. FIG. 3 illustrates a typical satellite system 40. The satellite system 40 includes an uplink earth station 50, a satellite 52, and receiving terminals 54, 54', 54'', 54'''. The satellite system 40 covers a footprint 56, which in the example in FIG. 3, is the continental United States. The footprint 56 typically covers an entire country or continent. Multicast data is data which is addressed to multiple receiving terminals 54. When the signal is carrying digital, packetized data, a geosynchronous satellite 52 is an excellent mechanism for carrying multicast data as a multicast packet need only be transmitted once to be received by any number of terminals 54. Such a signal, by carrying both unicast and multicast packets can support both normal point-to-point and multicast applications. Satellite multicast data systems are typically engineered with Forward Error Correcting (FEC) coding in such a way that the system is quasi-error free, that is, under normal weather conditions packets are hardly ever dropped.

The Internet Protocol (IP) is the most commonly used mechanism for carrying multicast data. Satellite networks capable of carrying IP Multicast data include Hughes Network System's Personal Earth Station VSAT system, Hughes Network System's DirecPC™ system as well as other systems by companies such as Gilat, Loral Cyberstar and Media4.

VSAT systems, such as the Personal Earth Station by Hughes Network Systems, use a satellite return channel to support two-way communication, when needed. For World Wide Web access, a terminal using a VSAT system sends HTTP requests to the Internet by means of the VSAT's inbound channel and receive HTTP responses via the outbound satellite channel. Other systems, such as DirecPC's™ Turbo Internet, use dialup modem. (as well as other non-satellite media) to send HTTP requests into the Internet and receive responses either via the outbound satellite channel or via the dialup modem connection. Satellite networks often have a longer latency than many terrestrial networks. For example, the round trip delay on a VSAT is typically 1.5 seconds while the round trip delay of dialup Internet access is typically only 0.4 seconds. This difference in latency is multiplied in the case of typical web browsing in that multiple round trips are required for each web page. This places web browsing via satellite at a distinct disadvantage relative to many terrestrial networks. The present invention provides a major reduction in this disadvantage and as such greatly increases the value of web browsing via satellite.

2. SUMMARY OF THE INVENTION

The present invention is directed to a communication network having an outbound high-speed channel carrying packetized data and either a satellite inbound channel or a terrestrial inbound channel, such as a dial-up connection to the internet. The communication network includes at least one upstream proxy server and at least two reporting downstream proxy servers, where the at least one upstream proxy server is capable of multicasting URLs to the at least two reporting downstream proxy servers. The at least two reporting downstream proxy servers interact with the at least one upstream proxy server to resolve cache misses and the at least one upstream proxy server returns at least one resolution to the cache misses via multicast. The proxy servers included in the communication system may include reporting proxy servers, non-reporting proxy servers, and best effort proxy servers. A reporting downstream proxy server interacts with an upstream proxy server to satisfy a cache miss. A non-reporting downstream proxy server interacts with a web server to satisfy a cache miss. A best effort downstream proxy server requests a cache-miss URL from both the upstream proxy server and the web server.

In one embodiment, the downstream proxy server filters multicast transmissions of URLs and stores the subset of the URLs for subsequent transmission where relative popularity is used to determine whether to store a multicast URL. In one embodiment, the upstream proxy server is capable of multicasting URLs to at least two reporting downstream proxy servers, the upstream proxy server interacts with the two reporting downstream proxy servers to resolve cache misses and the upstream proxy server returns at least one resolution to the cache misses via multicast.

In another embodiment, the downstream reporting proxy server includes a data base and a processor for receiving entries sent by an upstream proxy server, for filtering unpopular entries, keeping popular entries in the database, deleting previously stored entries from the data base, expiring previously stored entries from the data base, or reporting new entries to the upstream proxy server.

As described above, the communication system lowers user response time, lowers network utilization, and reduces the resources required by an HTTP proxy server.

In other embodiments, the present invention is directed to a proxy protocol which performs transaction multiplexing which prevents a single stalled request from stalling other requests, performs homogenized content compression which intelligently compresses HTTP request and response headers and performs request batching so that nearly simultaneously received requests are sent in a single TCP segment, in order to reduce the number of required inbound packets.

3. BRIEF DESCRIPTION OF THE DRAWINGS

FIG. 5a illustrates an upstream proxy server in one embodiment of the present invention.

FIG. 6 illustrates the TCP/IP packets which traverse the communication link for a single HTTP transaction without the benefit of the present invention.

FIG. 7 illustrates the TCP/IP packets which traverse the network medium for a single HTTP transaction with the benefit of one embodiment of the present invention.

FIG. 8 illustrates an HTTP request in one embodiment of the present invention.

FIG. 9 illustrates an HTTP response in one embodiment of the present invention.

4. DETAILED DESCRIPTION OF THE PREFERRED EMBODIMENT

4.1 INTRODUCTION TO THE INVENTION

While there has been some work using satellite multicast to preload an HTTP proxy server cache, the present invention includes several innovations which increase (often dramatically) the utility of such a system when a single user or small number of users access the network through a single satellite multicast receiving proxy. These innovations provide:

1. lower user response time;
2. lower network utilization; and

Figure 1:
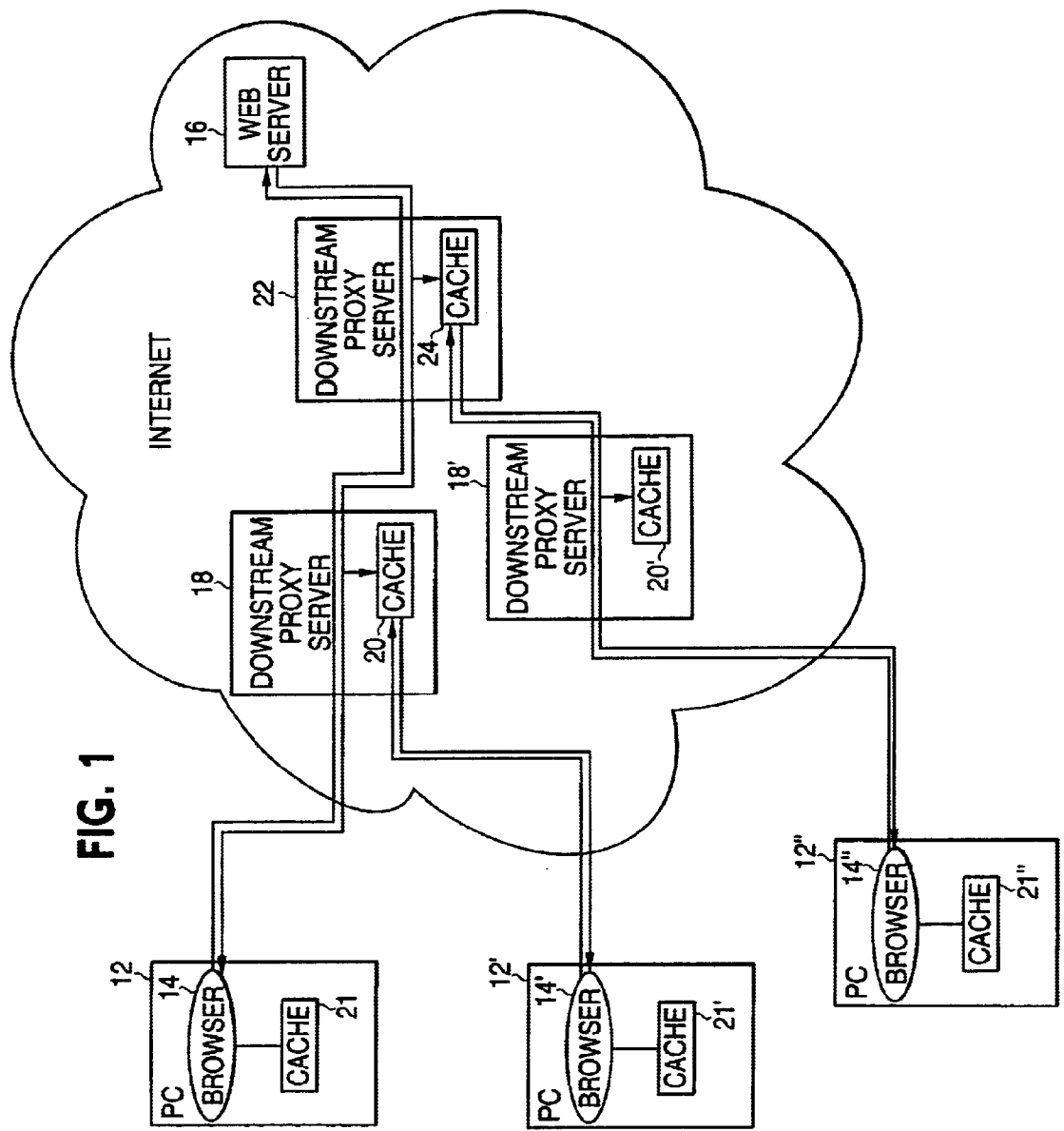
FIG. 1 illustrates a conventional system, including browsers, web servers, upstream and downstream proxy servers, and the execution of a GET COMMAND.
Figure 2:
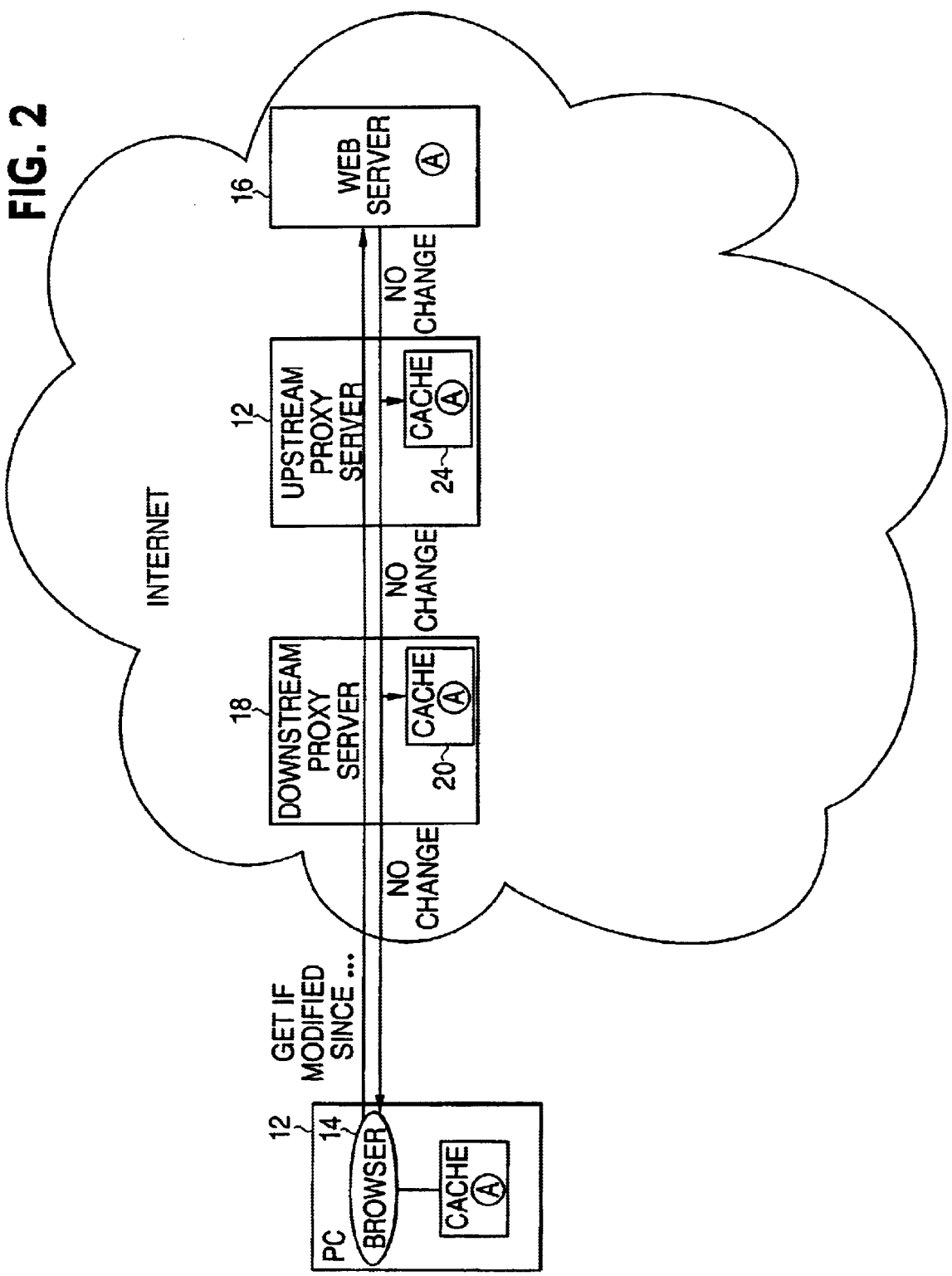
FIG. 2 illustrates a conventional system, including browsers, web servers, upstream and downstream proxy servers, and the execution of a GET IF MODIFIED SINCE COMMAND.
Figure 3:
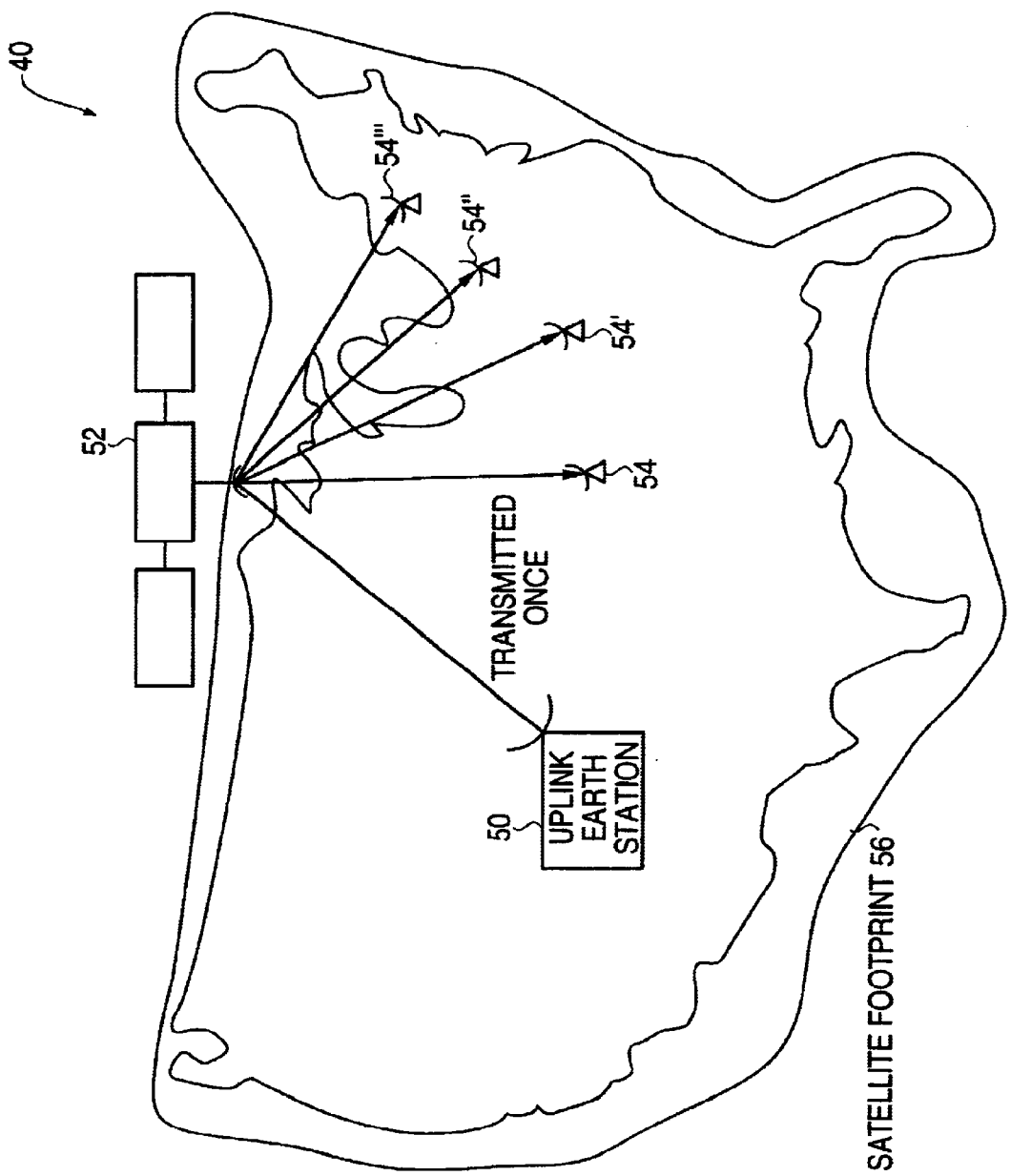
FIG. 3 illustrates a conventional satellite system.
Figure 4:
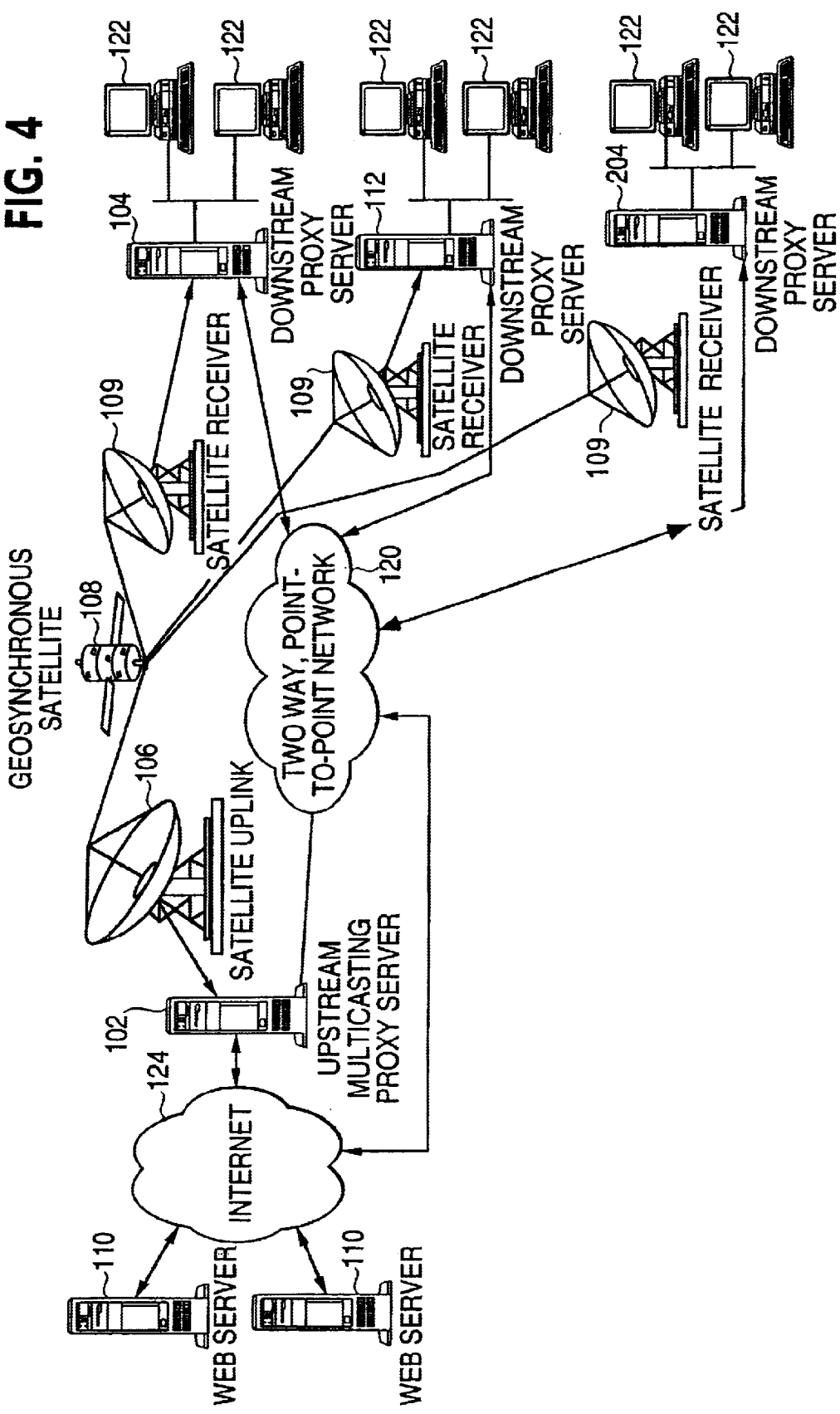
FIG. 4 illustrates a communication system in one embodiment of the preferred invention.

As depicted by FIG. 4, in one exemplary embodiment, the present invention includes an upstream, multicasting proxy server 102 and multiple downstream multicast receiving proxy servers 104, 112, 204. The upstream proxy server 102 multicasts web content to the downstream proxy servers 104, 112, 204 by means of a one-way capable multicast network such as a geosynchronous satellite broadcast. The one-way capable multicast network includes the satellite uplink 106, the geosynchronous satellite 108, and satellite receiver 109. A subset of the downstream proxy servers 104, referred to as "reporting proxy servers" interact with the upstream proxy server 102 by means of a two-way point-to-point capable network 120, examples of which include a dialup access internet network and satellite VSAT systems carrying interactive TCP/IP. Other downstream proxy servers 112 interact with web servers 110 for cache misses without going through the upstream proxy server 102. These proxy servers 112 are referred to as non-reporting proxy servers. Yet another class of downstream proxy servers 204 interact with both the upstream proxy server 102 and the web server 110 in parallel and passes the HTTP response back to a web browser of PC 122 from whichever responds first. These proxy servers are referred to as best effort proxy servers. In some cases, such as a VSAT system, the multicast network and the two-way point-to-point network may be a single integrated network. In other cases, they may be separate networks.

4.2 PRIOR ART SATELLITE MULTICAST CACHING PROXY SERVER SYSTEMS

There are two classes of known prior art satellite multicast caching proxy server systems.

Multicast push systems, such as, the DirecPC™ TurboWebCast service which is available with DirecPC™ sold by Hughes Network Systems, allow users to subscribe to a set of web channels, where a channel is typically a portion of a web site. The content of the channel is multicast file-transferred to subscribing users and a proxy server on the subscribing user's PC allows the user to access data from the cache offline, without any two-way connection to the Internet.

Large-scale multicast caching systems, such as the system developed by SkyCache multicast content to caching proxies loaded in cable modem head ends and Internet Service Provider points of presence (POPs).

As will be clear from the discussion that follows, the present invention distinguishes from the prior art in several ways, namely:

1. Unlike a multicast push system, the present invention reduces the response time and network utilization experienced by users without requiring any explicit subscription to content by the user and without requiring the preparation and maintenance of channel definitions by the satellite uplink.

2. Unlike large-scale multicast caching systems, the present invention includes novel filtering of multicast URLs to minimize the processing associated with filtering multicast URLs.

3. Unlike large-scale multicast caching systems, the present invention operates correctly and effectively without requiring the continuous operation of a downstream proxy.

4. Unlike large-scale multicast caching systems, the present invention often uses the multicast channel to send URLs in response to a downstream proxy server request thereby reducing the network loading on the point-to-point network connecting the downstream proxy to the upstream proxy. The point-to-point network and the multicast network are often a single, integrated satellite network. When this is the case, multicasting the URL consumes no more network capacity than transmitting it point-to-point while offering the benefit of possibly eliminating future transmissions of the URL by preloading the URL into other receiver's caches.

5. Unlike large-scale multicast caching systems, the present invention allows the downstream proxy server to automatically cease the processing of multicast traffic when a user is actively using a PC that the downstream proxy server is running on.
6. Unlike large-scale multicast caching systems, the downstream proxy servers pass usage information to the upstream proxy server. The upstream proxy server factors this usage information into its decision whether to multicast URLs.

4.3 SYSTEM OVERVIEW

The term TCP/IP in the context of this invention refers to either the current version of TCP/IP (IP version 4) or the next generations (for example, IP version 6). The basics of TCP/IP internetworking as known by one of ordinary skill in the art, can be found in "Internetworking with TCP/IP Volume 1" by Douglas Comer.

Figure 5:
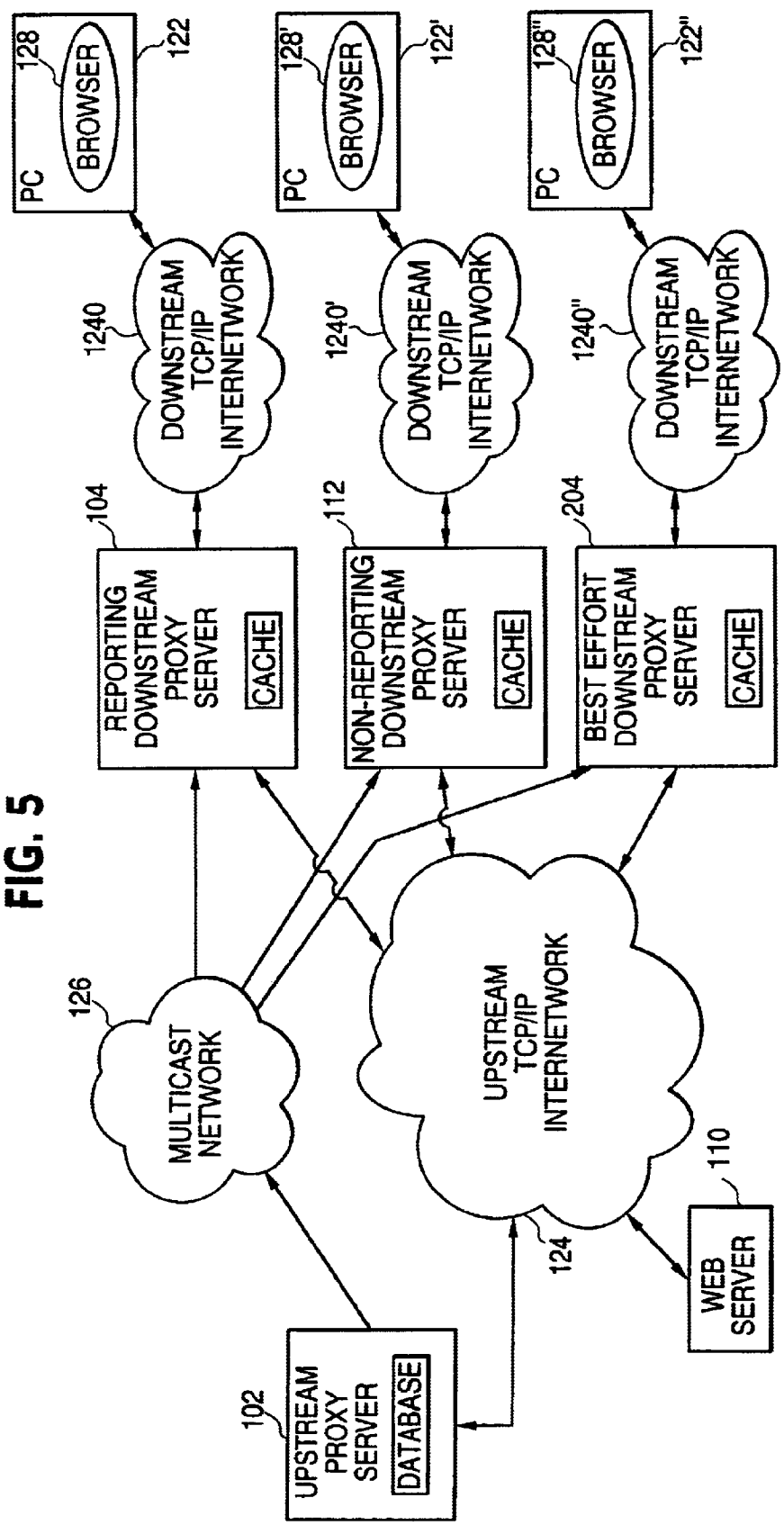
FIG. 5 illustrates a communication system in another embodiment of the present invention.

As illustrated in FIG. 5, the present invention allows web browsers 128, 128', 128" to access multiple web servers 110, only one such web server being depicted. The web servers 110 and the upstream proxy server 102 are connected to a TCP/IP internetwork 124 referred to as the upstream internetwork. The upstream proxy server 102 is able to multicast to the downstream proxy servers 104, 112, 204 by the multicast network 126. A subset of the downstream proxy servers 104, 204 interact with the upstream proxy server 102 by the TCP/IP internetwork 124. In some cases the upstream internetwork and the downstream internetwork are actually a single, integrated internetwork. Downstream proxy servers 104, 112, 204 are of one of three types which are referred to as follows:

Reporting downstream proxy servers 104 interact with the upstream proxy server 102 exclusively to satisfy a cache miss. Reporting downstream proxy servers 104 also report cache hits to the upstream proxy server 102. The reporting downstream proxy server 104 is the preferred type of downstream proxy server when the upstream internetwork 124 naturally routes all traffic from the downstream proxy server 104 through a nodes near the upstream proxy server 102. This is the case when the downstream proxy server 104 is connected to the Internet via a typical, star topology, two-way VSAT network.

Non-reporting downstream proxy servers 112 interact with the addressed web server 110 to satisfy a cache miss. This interaction with the web server 110 may take place either directly with the web server or by means of an upstream proxy server (not shown in FIG. 5) which is independent of the multicast capable upstream proxy server 102. Non-reporting downstream proxy servers 112 do not report cache hits to the upstream proxy server 102. A non-reporting downstream proxy server 112 is the preferred type of downstream proxy server when reporting downstream proxy servers 204 are operating so as to keep the upstream proxy server's estimation of URL popularity up-to-date and to keep the multicast network filled and when a low-complexity minimal processing and memory resources are desired in a subset of the downstream proxy servers.

Best effort downstream proxy servers 204 request a cache-miss URL from both the upstream proxy server 102 and the addressed web server 110. The request to web server 110 may optionally be taken either directly to the web server 110 or by means of an upstream proxy server (not shown in FIG. 5) which is independent of the multicast capable upstream proxy server 102. The best effort downstream proxy server 204 uses the first complete response from either the upstream proxy server 102 or the web server 110, the best effort downstream proxy server 204 is referred to as "best effort" in that best effort communications mechanisms are used between the downstream 204 and the upstream proxy server 102 both to request URLs and to report cache hits. The best effort downstream proxy server 204 is the preferred type of downstream proxy server when the upstream internetwork 124 does not naturally route all traffic from the downstream proxy server near the upstream proxy server. There are many examples where this is the case including where the upstream internetwork 124 is accessed by the downstream proxy server via a dialup modem connection.

As illustrated in FIG. 5a, the upstream proxy server 102 may include:
1. a processor 502 with RAM memory containing programs and data. As is well known in the art, the processor 502 may be implemented in hardware or software, if in hardware, digitally as discrete or integrated circuits. The processor 502 may also include a single processor or multiple processors, interconnected in parallel and/or serial;
2. a multicast transmit network interface 504 capable of transmitting multicast IP packets via the multicast network 126;
3. a point-to-point network interface 506 capable of sending and receiving TCP/IP packets via the upstream TCP/IP Internetwork 124; and
4. a database 508 accessible by the processor 502 containing the status (and optionally the content) of URLs of interest in the upstream proxy server 102.

As is well known to those skilled in the art, a single network interface, such as an ethernet interface, with the proper system routing is capable of carrying both multicast and point-to-point traffic and as such, an alternative implementation of the upstream proxy server 102 may utilize a single network interface 504/506 to carry both the multicast and point-to-point traffic.

Figure 5B:
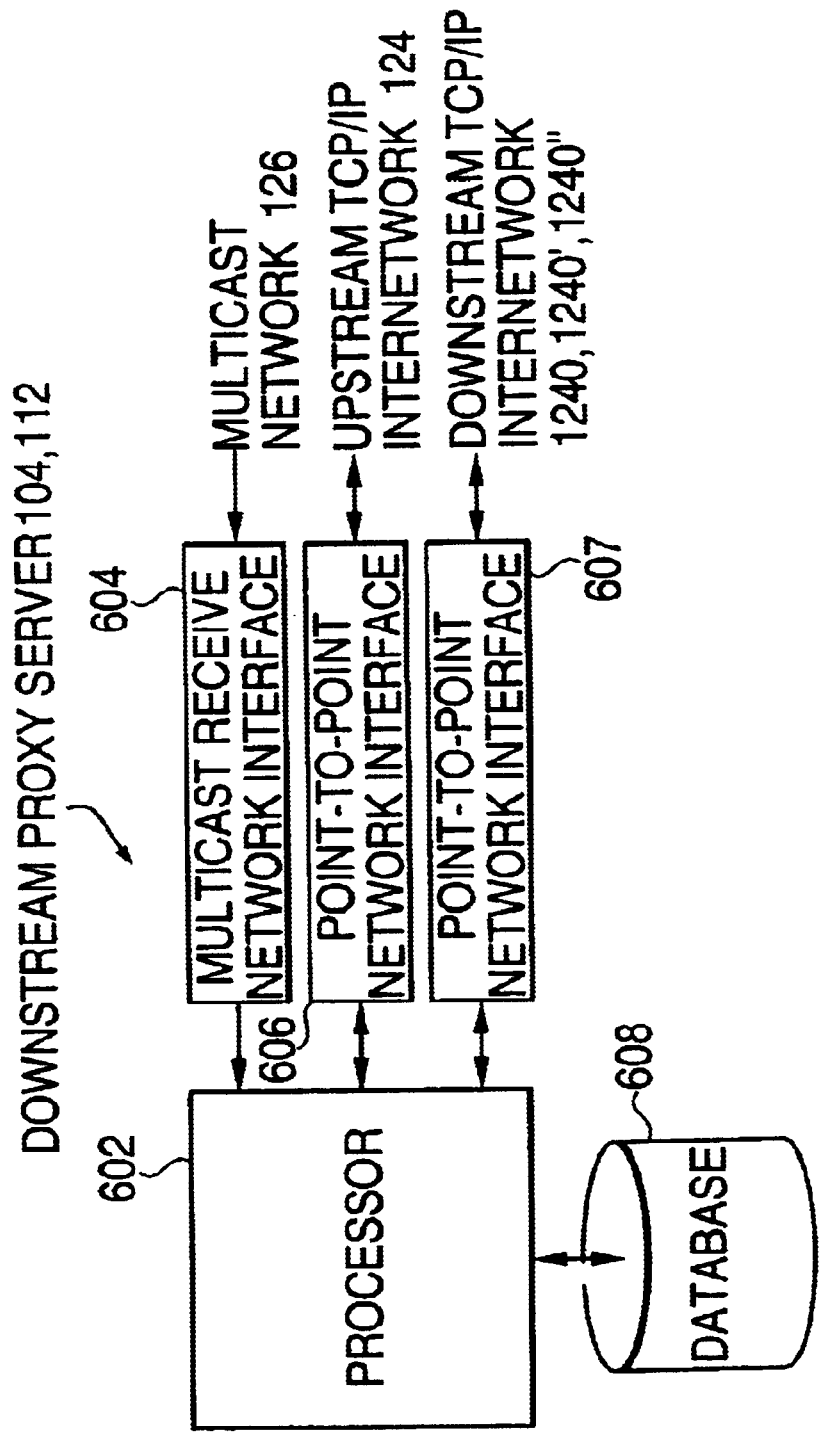
FIG. 5b illustrates a downstream proxy server in one embodiment of the present invention.

As illustrated in FIG. 5b, the downstream proxy server 104, 112, 204 may include:
1. a processor 602 with RAM memory containing programs and data. As is well know in the art the processor 602 may in actual practice be a computer containing a single or multiple processors operating in parallel;
2. a multicast receive network interface 604 capable of transmitting multicast IP packets via the multicast network 126;
3. a point-to-point network interface 606 capable of sending and receiving TCP/IP packets via the upstream TCP/IP Internetwork 124;
4. a point-to-point network interface 607 capable of sending and receiving TCP/IP packets via the downstream TCP/IP Internetwork 1240, 1240', 1240"; and
5. a database 608 accessible by the processor 602 containing a domain name cache containing entries for the domain names or IP addresses of web-servers 110, 110', 110" popularly accessed by clients of the downstream proxy server 104, 112 and a URL cache containing URLs and associated content which can be provided to clients should they request them.

As is well known to those skilled in the art, a single network interface, such as an ethernet interface, with the proper system routing is capable of carrying both multicast and point-to-point traffic and as such, an alternative implementation of the downstream proxy server 104, 112 may utilize a single network interface to carry both the multicast and upstream TCP/IP Internetwork and downstream TCP/IP Internetwork traffic. Other alternatives include the use of two network interfaces with one of the network interfaces carrying the traffic of two of the network interfaces enumerated above.

The upstream proxy server 102 determines which URLs to multicast and multicasts the URLs and information summarizing URL status. An HTTP URL begins with the string "http://" followed by either the domain name or the IP address of the web server which can serve the URL. The upstream proxy server 102 multicasts URLs in such a way to facilitate the filtering of URLs by web server domain name or IP address. When the upstream proxy server 102 multicasts a URL, it multicasts the URL, the HTTP response header associated with the URL and expiration information for the URL.

Downstream proxy servers 104, 112, 204 maintain a domain name cache from recently accessed URLs. The cache has a maximum size and when a new item is inserted into a full cache, an older, less frequently accessed domain name must be removed to make room for the new item. The downstream proxy servers 104, 112, 204 maintain the relative popularity of each domain name in the cache where popularity is defined by the frequency of HTTP requests to the site. The downstream proxy servers 104, 112, 204 filter out all multicast URLs (and URL status) except those from the most popular entries in the domain name cache. URLs which pass the filter are candidates for being cached.

When a browser 128 requests a URL from the downstream proxy servers 104, 112, 204 the downstream proxy servers 104, 112, 204 update the popularity of that domain name's cache entry adding a new entry for the URL's domain name if not already present. The downstream proxy server 104, 112 then looks up the URL in the downstream proxy server's URL cache. What happens after this depends on whether the URL is found in the cache, whether the URL has expired and whether the downstream proxy server is a reporting 104, non-reporting 112, or best-effort 204 server.

The downstream proxy server 104, 112, 204 directly returns the URL to the browser when the URL is found in the cache and the URL has not expired. A reporting proxy server 104 or a best effort proxy server 204 saves the URL address for subsequent reporting to the upstream proxy server 102. When found and unexpired, both user response time and network utilization are reduced.

The downstream proxy server 104, 112, 204 performs a GET IF MODIFIED SINCE operation against the upstream proxy server 102 when the URL is found and is expired. The downstream proxy server 104, 112, 204 thus checks to make sure the content is up to date.

When a cache lookup finds the URL in the cache and the URL is expired, the processing that takes place depends on the type of downstream proxy server.

A reporting downstream proxy server 104 performs a GET IF MODIFIED SINCE operation against the upstream proxy server 102 when the URL is found and is expired. The reporting downstream proxy server 104 piggybacks any saved URL addresses on the GET IF MODIFIED SINCE request.

A non-reporting downstream proxy server 112 performs a GET IF MODIFIED SINCE operation against the web server 110 when the URL is found and is expired.

A best effort downstream proxy server 204 performs a GET IF MODIFIED SINCE operation against both the upstream proxy server 102 and against the web server 110 in parallel when the URL is found and is expired.

Network utilization and response time are reduced by the present invention in the case of a downstream proxy cache hit of an expired URL provided the GET IF MODIFIED SINCE transaction indicates that the URL has not changed. This is because the actual URL content need not traverse the upstream internetwork 124.

When the URL is not found in the downstream proxy server's cache, the processing that takes place depends on the type of downstream proxy server.

When the cache lookup fails, a reporting downstream proxy server 104 relays the web browser's 128 GET or GET IT MODIFIED SINCE transaction to the upstream proxy server 102 piggybacking any unreported saved URL addresses. As will be discussed later, response time is often reduced even for this case as an HTTP transaction is performed across the proxy-to-proxy link is typically faster than a browser to web server HTTP transaction.

When the cache lookup fails, a non-reporting downstream proxy server 112 relays the web browser's 128' GET or GET IT MODIFIED SINCE transaction to the web server.

When the cache lookup fails, a best effort downstream proxy server 204 relays the web browser's 128" GET or GET IF MODIFIED SINCE transaction to both the upstream proxy server 102 and to the web server. As will be discussed later, response time may be reduced even for this case if the upstream proxy server responds to this transaction and the response arrives sooner than the web server's response.

Figure 5C:
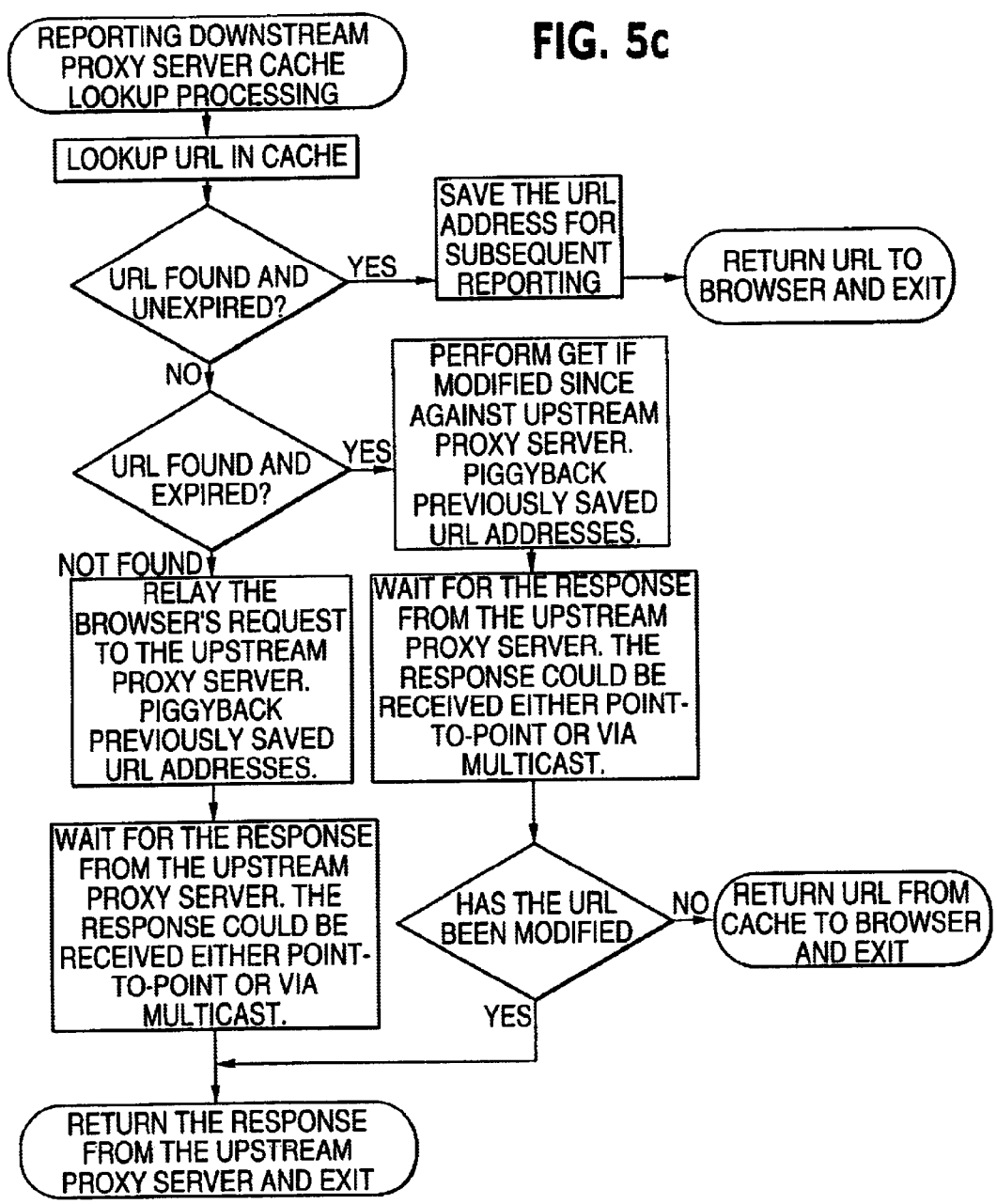
FIG. 5c illustrates the cache lookup processing performed by a reporting downstream proxy server in one embodiment of the present invention.
Figure 5D:
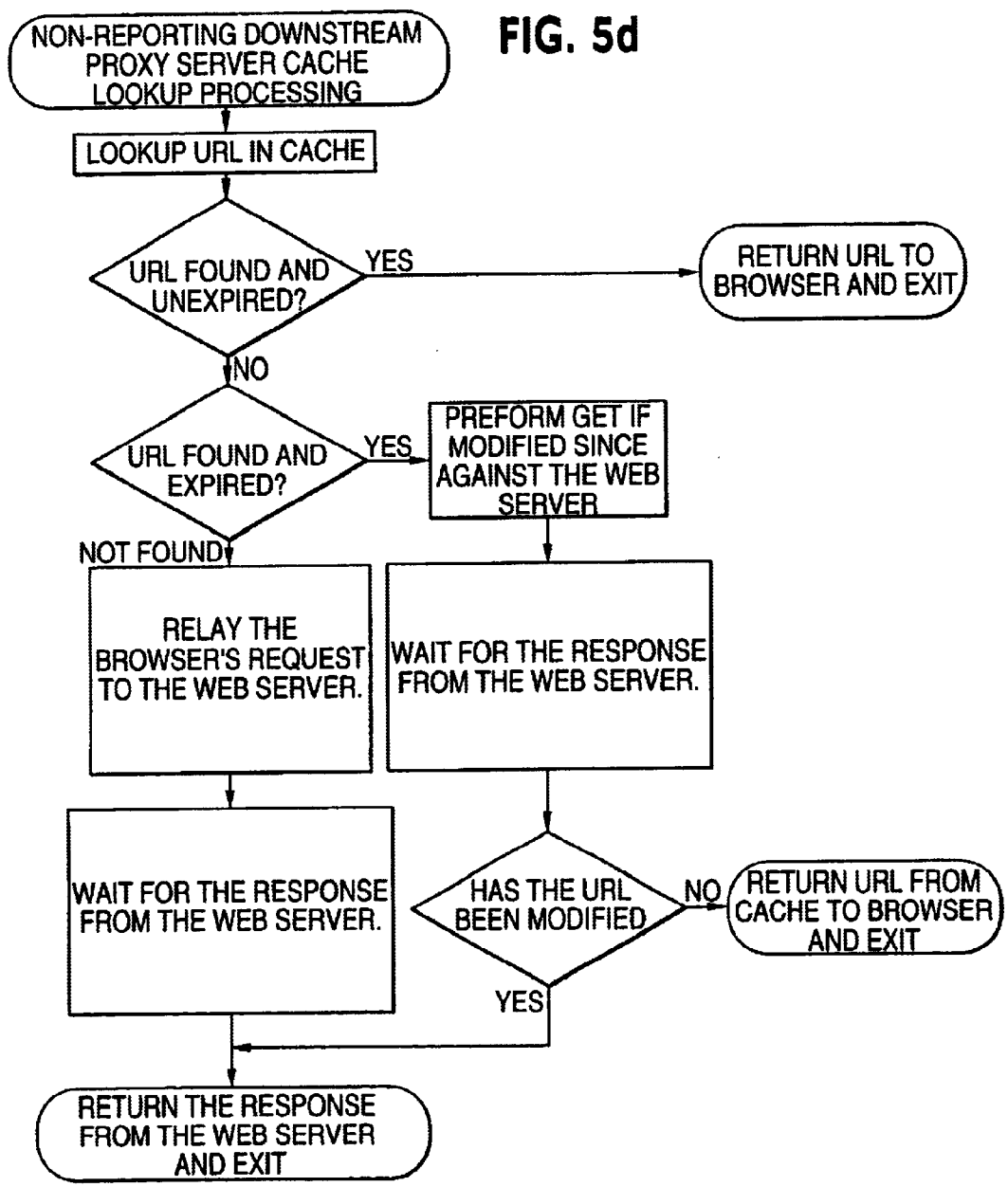
FIG. 5d illustrates the cache lookup processing performed by a non-reporting downstream proxy server in one embodiment of the present invention.
Figure 5E:
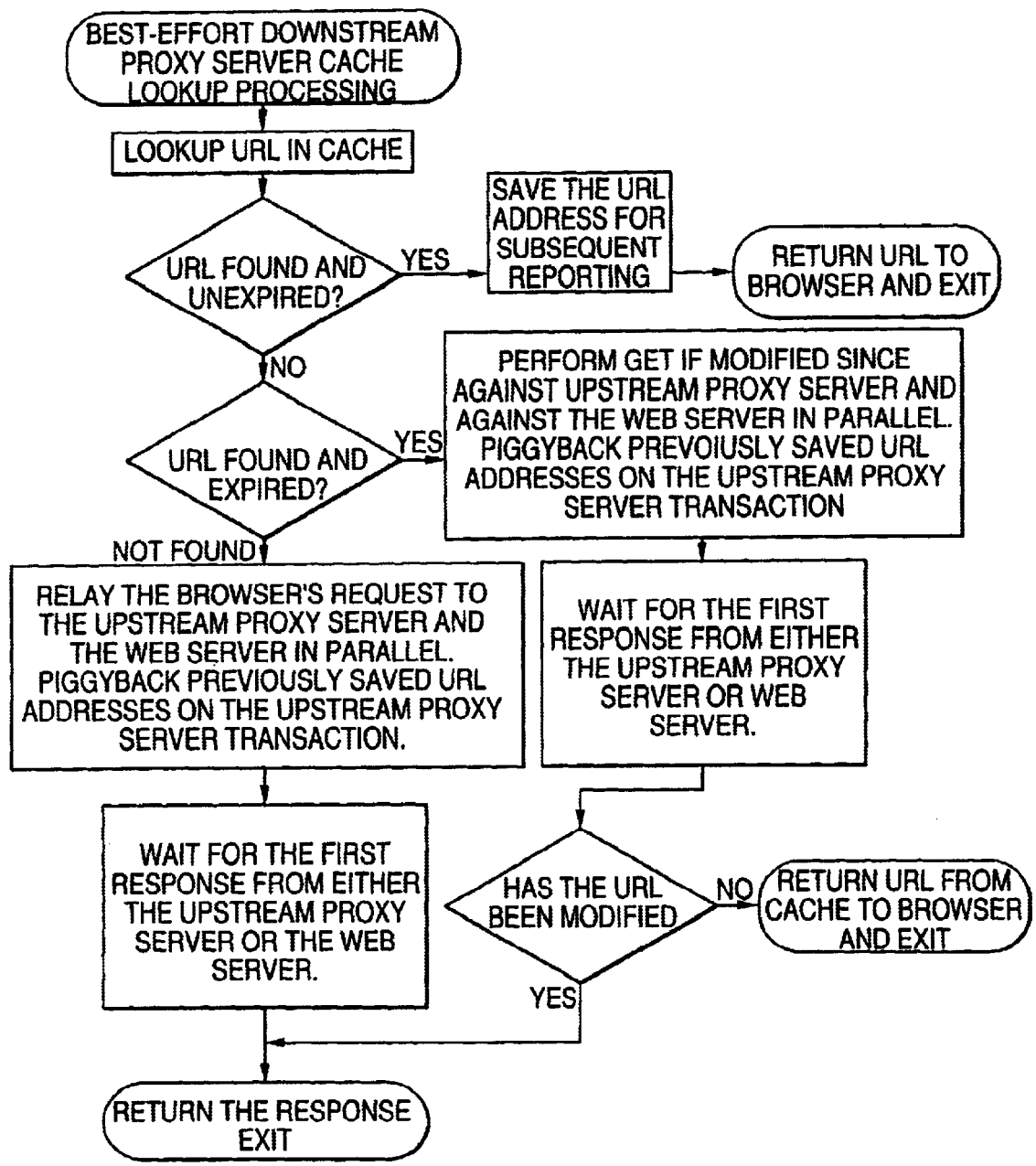
FIG. 5e illustrates the cache lookup processing performed by a best-effort downstream proxy server in one embodiment of the present invention.

FIGS. 5c, 5d, and 5e illustrate the processing flow for performing cache lookup for the reporting downstream proxy server 104, non-reporting downstream proxy server 112, and best-effort downstream proxy server 204, respectively.

The upstream proxy server 102 keeps a database of URLs. In some implementations the upstream proxy server 102 is a caching server. When the upstream proxy server 102 is a caching server the URL database may either be integrated with the cache or operate independently of the cache. When the upstream proxy server 102 receives a request for a URL, in some cases it produces a full HTTP response, either from its cache or by interacting with the web server 110 or interacting with a yet further upstream proxy server (not shown in FIG. 5). The upstream proxy server 102 then looks up the URL in its database, updates its entry (or creates the entry if one does not already exist), and determines, based on various criteria discussed later, whether to respond at all and whether to multicast the response. The upstream proxy server 102 returns a point-to-point HTTP response to the reporting downstream proxy server 104 regardless of whether a multicast response is being sent. When a multicast response is being sent, the point-to-point HTTP response signals the reporting downstream proxy server 104 to receive the response via multicast. The upstream proxy server 102 only returns a point-to-point response to a best effort downstream proxy server 204 when the response indicates that the URL is not expired and not modified. Responses containing URL content, when sent to a best effort downstream proxy server 204, are sent only via multicast.

The downstream proxy servers 104, 112, 204 use their domain name caches to efficiently filter and process URLs which have been multicast. The downstream proxy servers 104, 112, 204 discard multicast URLs for domain names not present in the domain name cache. The mechanism for multicasting URLs and for discarding URLs based on domain name is optimized, as will be described in detail later, to reduce the processing required by the downstream proxy servers 104, 112, 204. The downstream proxy servers 104, 112, 204 receive and process multicast URLs for a subset of the domain names in the cache. This subset includes the domain names for which the downstream proxy has an outstanding request to the upstream proxy server 102 and the domain names which the caching policy determines as being most likely to have URLs which will be worth storing in the cache.

A reporting or best effort downstream proxy's 104, 204 domain name cache is organized so that when the proxy server 104, 204 has an HTTP request outstanding to the upstream proxy server 102 that the domain name (or IP address) from the requested URL address is locked in the domain name cache. This ensures that when a response is multicast, the response passes the downstream proxy server's 104, 204 filter and will be processed by the downstream proxy server 104, 204.

When the downstream proxy server 104, 112, 204 receives a multicast URL or URL status update, it submits the URL to its URL caching policy. The caching policy decides whether to store the multicast URL, delete a previously stored URL or expire a previously stored URL. In this way, the downstream proxy server 104, 112, 204 builds up its URL cache with URLs which may be accessed at a later time.

In many systems, such as two-way star-network VSAT systems, both multicast responses and point-to-point responses are carried on a single outbound channel. In such systems, multicasting a response has the benefit of potentially preloading the cache of many receivers while taking no more outbound bandwidth than a point-to-point response. Preloading a cache with a URL reduces network utilization and response time when a successful lookup for that URL occurs at a later time. Overall, the multicasting of responses has the twin benefits of reducing network utilization and response time.

5. PROXY TO PROXY PROTOCOL

5.1 INTRODUCTION

The World Wide Web's use of HTML and the HTTP 1.0 protocol, the version currently in use by almost all browsers, is both inefficient and has very slow response time when operating over satellite networks. This is because HTTP requires a separate TCP connection for each transaction. Multiplying the inefficiency is HTML's mechanism for creating frames and embedding images which requires a separate HTTP transaction for every frame and URL. This particularly affects VSAT networks which have a relatively long round trip delay (1.5 sec) and are cost-sensitive to the number of inbound packets.

FIG. 6 illustrates the packets which traverse the satellite link for a single HTTP transaction and the typical response time. FIG. 7 illustrates the packets which traverse the satellite link (or other network medium) for a single HTTP transaction in the present invention when a reporting downstream proxy server 104 performs the transaction against the upstream proxy server 102. Table 1 illustrates the cumulative effect of this on a HTML page, like www.cnn.com, containing 30 URLs in terms of the total number of inbound packets and the total delay for accessing such a web page. Table 1 also shows the beneficial effects of acknowledgement reduction as described in U.S. Pat. No. 5,985,725 to Dillon entitled "Method and Apparatus for Requesting and Retrieving Information for a Source Computer Using Terrestrial and Satellite Interface" issued Nov. 30, 1999, without which the packet count would be much higher.

As can be seen in Table 1, the response time for a 30 URL web page goes from 16.5 seconds without the present invention to 7.5 seconds with the present invention. This is better than a 2 to 1 reduction in response time. As also can be seen from Table 1, the number of inbound packets per 30 URL web page goes from 121 to 30, a better than 4 to 1 reduction.

TABLE 1

Response Time And Inbound Packets For A 30 URL Web Page Over VSAT

| | Inbound Packets | Response Time (sec) | Description |
|---|---|---|---|
| \multicolumn{4}{c}{Time For Individual Operation With HTTP 1.0} | | | |
| A | 1 | 1.5 | Domain Name Lookup |
| B | 4 | 3 | One HTTP Get (assuming no web server delay) |
| \multicolumn{4}{c}{Time For An Entire Web Page With HTTP 1.0 (assume 8 browser connections)} | | | |
| A + B | 5 | 4.5 | The HTML URL (first) |
| B | 32 | 3 | First 8 embedded images |
| B | 32 | 3 | Second 8 embedded images |
| B | 32 | 3 | Third 8 embedded images |
| B | 20 | 3 | Last 5 embedded images |
| | 121 | 16.5 | Total For 30 URL Web Page |
| \multicolumn{4}{c}{Time For Individual Operation With Present Invention} | | | |
| C | 0 | 0 | Domain Name Lookup (no satellite round trip, performed by upstream proxy) |
| D | 1 | 1.5 | One HTTP Get (no connection establishment) |
| E | 2 | 1.5 | Last HTTP Get (ack for last data) |
| \multicolumn{4}{c}{Time For An Entire Web Page With Present Invention} | | | |
| C + D | 1 | 1.5 | The HTML URL (first) |
| D | 8 | 1.5 | First 8 embedded images |
| D | 8 | 1.5 | Second 8 embedded images |
| D | 8 | 1.5 | Third 8 embedded images |
| E | 4 | 1.5 | Last 5 embedded images |
| | 29 | 7.5 | Total For 30 URL Web Page |

With HTTP 1.1, the proposed enhancement to HTTP 1.0, which improves the response time and networking efficiency of HTTP 1.0, the present invention provides even greater improvements. The present invention provides better compression than HTTP 1.1 and, unlike HTTP 1.1, does not allow a single slow or stalled HTTP request to slow down other requests.

5.2 PROXY-TO-PROXY (P2P) PROTOCOL OVERVIEW AND BENEFITS

The present invention replaces the HTTP protocol often used between upstream 102 and reporting downstream 104 proxy servers with a protocol optimized for this role referred to as the Proxy-To-Proxy (P2P) protocol. The P2P protocol carries HTTP transactions between the downstream 104 and upstream 102 proxy servers.

The P2P protocol carries HTTP 1.0 and 1.1 request and response headers and content where the request and response headers include extensions to support multicast cache pre-loading.

Apart from these multicast header extensions, the P2P protocol improves over HTTP transport in the following ways:

Transaction Multiplexing—improves over separate connection for each transaction (HTTP 1.0) and pipelining (HTTP 1.1) by preventing a single stalled request from stalling other requests. This is particularly beneficial when the downstream proxy server 104 is supporting simultaneous requests from multiple browsers 128, 128', 128".

Homogenized Content Compression—improves over HTTP 1.1 content compression by intelligently compressing HTTP request and response headers and by allowing compression streams for common data to extend over multiple URLs. This increases the overall compression ratio. HTTP 1.1 does not compress request and response headers. This is particularly important when the inbound channel is a shared wireless medium such as a VSAT inroute or some other wireless medium. It effectively allows many more subscribers to share the available inbound bandwidth.

Request Batching—batches HTTP requests which arrive at nearly the same time so that the requests get sent over the satellite in a single TCP segment, thereby reducing the number of inbound packets.

5.3 TRANSACTION MULTIPLEXING

The P2P protocol rides on top of a general purpose protocol, the TCP Transaction Multiplexing Protocol (TTMP). TTMP allows multiple transactions, in this case HTTP transactions, to be multiplexed onto one TCP connection.

The downstream proxy server 104 initiates and maintains a TCP connection to the upstream proxy server 102 as needed to carry HTTP transactions. The TCP connection could be set up and kept connected as long as the downstream proxy server 104 is running and connected to the downstream internetwork 124. It could also be set up when the first transaction is required and torn down after the connection has been idle for some period.

An HTTP transaction begins with a request header, optionally followed by request content which is sent from the downstream proxy server 104 to the upstream proxy server 102. This is referred to as the transaction request. An HTTP transaction concludes with a response header, optionally followed by response content. This is referred to as the transaction response.

The downstream proxy server 104 maintains a transaction ID sequence number which it increments with each transaction. The downstream proxy server 104 breaks the transaction request into one or more blocks, creates a TTMP header for each block, and sends the blocks with a TTMP header to the upstream proxy server 102. The upstream proxy server 102 similarly breaks a transaction response into blocks and sends the blocks with a TTMP header to the downstream proxy server 104. The TTMP header contains the information necessary for the upstream proxy server 102 to reassemble a complete transaction command and to return the matching transaction response. The TTMP header contains:

The transaction ID—the transaction sequence number must rollover less frequently than the maximum number of supported outstanding transactions.

Block Length—allows a proxy server 102, 104, 112, 204 to determine the beginning and ending of each block. As is well known by those skilled in the art, byte stuffing and other techniques can be used, rather than length fields, to identify the beginning and ending of blocks of data.

Last Indication—allows the proxy server 102, 104, 112, 204 to determine when the end of a transaction response has been received.

Abort Indication—allows the proxy server 102, 104, 112, 204 to abort a transaction when the transaction request or response cannot be completed.

Compression Information—defines how to decompress the block as explained in more detail in Section 3.4 below.

By breaking transaction requests into blocks and allowing the blocks from different transactions to be interleaved, the P2P protocol of the present invention benefits from allowing a single TCP connection to simultaneously carry multiple HTTP requests without allowing a single stalled (partially received) transaction request or response to block other transactions. The P2P protocol also allows transaction response information to be relayed back to the downstream proxy server 104 in the order it is provided by the various web servers 110, again preventing a stalled or slow web server from delaying URLs from other web servers 110.

The use of a single HTTP connection, rather than the multiple connections used with HTTP 1.0 and optionally with HTTP 1.1 reduces the number of TCP acknowledgements sent over the inbound medium. Reduction in the number of TCP acknowledgements significantly reduces the use of inbound networking resources which, as said earlier, is very important when the inbound is a shared medium such as a VSAT or other wireless medium. This reduction of acknowledgements is more significant when techniques, such as those described in U.S. Pat. No. 5,985,725 to Dillon entitled "Method and Apparatus for Requesting and Retrieving Information for a Source Computer Using Terrestrial and Satellite Interface" issued Nov. 30, 1999, minimize the number of TCP acknowledgements per second per TCP connection.

For example, the Hughes Network Systems DirecPC™ Enterprise Edition networking product reduces the number of TCP acknowledgements per connection sent over the satellite link to two per second regardless of the amount of traffic flowing on that connection. Without the present invention, a web browser 110 might utilize eight HTTP 1.0 connections in parallel across the satellite link. With the present invention, only a single connection is run. As a result, the present invention reduces the inroute acknowledgement traffic eight-fold. If multiple web browsers 110 are operating in parallel, this reduction in inbound acknowledgement traffic is further increased.

5.4 HOMOGENIZED CONTENT COMPRESSION

HTTP 1.1 defines a single algorithm for compressing URL content and each URL's content is individually compressed. The P2P protocol achieves a higher compression ratio than HTTP 1.1 as follows:

Does not restart a compression algorithm with each data item being compressed.

Uses algorithms optimized to the type of data being compressed.

Compresses HTTP request and response headers.

5.4.1 Introduction to Lossless Compression

Lossless compression algorithms can in general be classified into two broad types: statistics-based and dictionary-based. Statistics-based compression algorithms exploit the probability distribution of the data to encode the data efficiently. Two well-known algorithms of this type are Huffman coding and arithmetic coding. The process of statistics-based coding can be split into two parts: a modeler that estimates the probability distribution of data, and an encoder that uses the probability distribution to compress the data. According to information theory, it is possible to construct an optimal code that asymptotically comes arbitrarily close to the entropy rate of the data. Huffman coding can achieve asymptotic optimality by blocking symbols into large groups, however this is computationally infeasible. Moreover, Huffman coding is not suitable for handling adaptive statistics of data. On the other hand, arithmetic coding overcomes these drawbacks of Huffman coding and achieves asymptotic optimality without sacrificing computational simplicity. The essential drawbacks of statistics-based coding are their slower speed (compared to dictionary-based algorithms), and the inaccuracies in statistical modeling of data. Regarding the latter issue, accurate modeling of data requires sophisticated statistical techniques, which in turn require large amount of training data, which is often unavailable.

On the other hand, dictionary-based compression algorithms achieve compression by replacing a string of symbols with indices from a dictionary. The dictionary is a list of strings that are expected to occur frequently in the data. Such a dictionary could either be a static pre-defined dictionary, or an adaptive dictionary that is built and updated as data is compressed. Dictionary-based compression algorithms usually require less computational resources than statistics-based techniques. Lempel-Ziv (LZ) type compression is a general class of adaptive dictionary-based lossless data compression algorithms. LZ-type compression algorithms are based upon two distinct type of approaches—LZ77 and LZ78. An LZ77-type algorithm adaptively builds a dictionary only at the transmitter end of the lossless connection. Compression is achieved by sending a pointer along with size of match of matching phrases occurring in the already compressed portion of the data stream. The receiver end of the connection does not need to maintain a dictionary, thereby minimizing memory requirements, and can decode the compressed data very quickly. LZSS is a commonly used lossless data compression algorithm based on LZ77.

Commonly used LZ78-type lossless data compression algorithms, for example LZW and the algorithm used in the ISO V.42bis specification, use a dictionary (or other data structure) which is built up on both ends of a lossless connection, such as a TCP connection, as data is transferred across the link. Compression is achieved by sending a reference into the dictionary in place of an uncompressed string of bytes. The references are constructed to be smaller than the original string, but sufficient to restore the original string together with the dictionary. These algorithms automatically tune the dictionary as data is transferred so that the dictionary is well prepared to provide high compression should data similar to earlier previously transferred data be submitted for compression.

The term compression stream refers to a compressor and decompressor each with their own dictionary at opposite ends of a lossless connection. For LZ78-type algorithms, encoding is faster than LZ77-type algorithms, however the decoders are slower and have considerably higher memory requirements.

These algorithms are much more efficient when they are processing relatively large amounts of similar data. For example, one HTML page is very similar to subsequent HTML pages, especially when the pages come from the same web server 110. Maximum compression is not obtained immediately after a dictionary is initialized, as it has not been tuned to compress the data at hand.

5.4.2 P2P Use of Lossless Data Compression

The data passed across the P2P protocol can be categorized into the following groups of data:
1. HTTP Request And Response Headers
2. HTML—sent from the upstream proxy 102 to the downstream proxy 104, 112.
3. Precompressed data—entity bodies (URL content) such as JPEG and GIF images which are known to be precompressed and do not benefit from further compression attempts.
4. Other—other entity body (URL content) data.

The P2P protocol of the present invention maintains a separate compression stream in each direction for each category of data. This ensures, for example, that downstream HTML data is sent through a compression stream whose dictionary is well tuned for processing HTML providing a higher compression ratio than could be expected from individually compressing each HTML page.

The P2P protocol of the present invention uses compression algorithms for each category of data which are efficient for their category of data. For example, P2P uses:

1. HTTP Requests and Response Headers each are fully text, with plenty of standard keywords. This motivates the use of a dictionary-based algorithm whose dictionary is constructed using the frequently occurring standard keywords. Such a scheme is further improved by combining the static dictionary approach with the power of adaptive dictionary approach of LZ-type algorithm. The static dictionary compresses the standard phrases, while LZ compresses those phrases that are not standard but repeat in the data.
2. HTML data is fully text and warrants the use of a data compression algorithm optimized for text. LZW works well with text and may be used for HTML data when using a more highly optimized algorithm is not convenient.
3. No compression is used for precompressed data to avoid wasting CPU attempting to compress data, which cannot be further compressed.
4. Other data is compressed with a general purpose compression algorithm such as LZW.

As is well known to those skilled in the art, an HTTP request includes an HTTP request header optionally followed by a message body. An HTTP request header further includes a series of one-line, ASCII strings with each string referred to as an HTTP request header field. The end of an HTTP request header is delimited by an empty line. FIG. 8 illustrates a typical HTTP request header.

As is also well known to those in the skilled in the art, an HTTP response includes an HTTP response header optionally followed by a message body. An HTTP response header further includes a series of one-line, ASCII strings with each string referred to as an HTTP response header field. The end of an HTTP response header is delimited by an empty line. FIG. 9 illustrates a typically HTTP response header. The first line of an HTTP response includes the status code, a 3 digit decimal number, which summarizes the type of response being provided. In the example in FIG. 9, a 200 response code is being provided which means that the response was "OK" and that the message body contains the requested URL.

5.5 HTTP 1.1 EXTENSIONS TO SUPPORT MULTICAST CACHE PRELOADING

The present invention includes an addition to a HTTP request used to report cache hit usage reporting and an addition to an HTTP response to direct a reporting downstream proxy server 104 to expect the HTTP response via multicast rather than via P2P. The use of the additions will be explained in detail below.

5.5.1 HITREP HTTP Request Extension

By adding a HITREP header field to an HTTP request a reporting downstream proxy 104 or a best effort downstream proxy server 204 may report to the upstream proxy 102 cache hits which occurred on unexpired URLs. A HITREP attribute is formatted as follows:

HITREP=comma separated list of URLs.

The upstream proxy 102 removes this attribute prior to forwarding the HTTP request to the web server 110. It uses the information to update its hit database entries of the contained URLs in a way which increases the likelihood that updates to these URLs will be multicast.

5.5.2 Mcast Status Code

The upstream proxy 102 directs a reporting downstream proxy server 104 to expect the URL to be sent via multicast by returning a Mcast Status Code. In one embodiment, the Mcast Status Code has a value of 360.

5.6 Best Effort Downstream Proxy Server To Upstream Proxy Server Transactions The best effort downstream proxy server 204, for efficiency, uses the User Datagram Protocol (UDP) to transmit HTTP GET and GET IF MODIFIED SINCE requests to the upstream proxy server 102. This is done by placing the HTTP request header into the UDP payload. In order to piggyback cache hit reports on an HTTP request, the HTTP request header may contain a HITREP field as described earlier.

The use of UDP is very efficient as the overhead of establishing, maintaining and clearing TCP connections is not incurred. It is "best effort" in that lost UDP packets are not recovered. Even with lost packets, the upstream proxy server 102 obtains a very representative view of the URLs of interest to the best effort downstream proxy servers.

6. MULTICAST PROXY TO PROXY PROTOCOL

6.1 URL TRANSPORT

The Advanced Television Enhancement Forum (ATVEF) has published their 1.0 specification containing a description of the Unidirectional Hypertext Transport Protocol (UHTTP). UHTTP defines a method for multicasting URLs. The present invention uses UHTTP with extensions to transport URLs through the multicast network 126 and uses special multicast addressing to minimize the CPU time expended discarding data not of interest.

6.2 MULTICAST ADDRESSING

The multicast system of the present invention is improved to support a single web browser 128 or a small number of browsers 128. When a small number of users (10 or less) is involved, the history of previously visited sites is a strong predictor of future accesses. The present invention leverages this insight to dramatically reduce the processing required to filter multicast URLs. Large scale multicast proxy systems do not leverage this insight as it does not apply significantly when many users are accessing a proxy.

The upstream proxy server 102, when deciding whether to multicast a URL, also classifies the URL as being either of general or specific appeal. General URLs are sufficiently popular to be multicast to all the downstream proxies 104, 112, 204 regardless of the downstream proxy's previous history of sites visited. An example, where this might be applicable would be NASA's Jet Propulsion Laboratory's when the comet hit Jupiter. Many users which had never visited JPL's website would go to that site.

The upstream proxy server 102 multicasts general URLs on a single IP multicast address.

To minimize processing of specific URLs, the upstream proxy server 102 spreads the transmission of specific URLs over a large group of multicast addresses. In a preferred embodiment, the upstream proxy server 102 takes the domain of a specific URL and performs a hash function (or any other technique known to one of ordinary skill in the art) to select the multicast address on which the URL is to be multicast. Alternatively, in another embodiment, the upstream proxy server 102 takes the IP address corresponding to the source of the URL and performs a hash function (or any other technique known to one of ordinary skill in the art) on the IP address to select the multicast address on which the URL is to be multicast. The use of hash functions is well understood within the computer. science community and is introduced in "Data Structures and Algorithms in C++," Adam Drozdek, PWS Publishing Co., Sections 10–10.1, 1996. The downstream proxy servers 104, 112, 204 utilize the same hash function to determine, from their domain name cache, the set of multicast addresses to open. This mechanism allows a downstream proxy server 104, 112, 204 to use the destination multicast IP address to filter out most of the specific URLs. For downstream proxy servers 104, 112, 204 that have hardware multicast address filtering this effectively eliminates almost all the CPU time spent on filtering specific URLs. Even downstream proxy servers 104, 112, 204 without hardware address filtering can more efficiently filter URLs based on destination address rather than digging into a packet and filtering based the domain name. Filtering based on domain names is based on string comparison operations and is inherently slower than filtering based on unsigned integer comparisons as is the case with hash functions.

Table 2 illustrates how the use of hash function addressing reduces downstream proxy server 104, 112, 204 processing by efficiently limiting the traffic which must be processed.

Hash Function Addressing Filter Effectiveness 50,000 MulticastAddresses Assigned To Carry Specific URLs 100 Domain Names In The Domain Name Cache 1/500 Fraction Of Specific URL Multicast Traffic Passing The Multicast Address Filter

6.3 HTTP 1.1 EXTENSIONS TO SUPPORT MULTICAST PRELOADING

The present invention includes extensions to the HTTP response header to guide a downstream proxy server 104, 112, 204 processing of multicast URLs.

6.3.1 URL Popularity

The upstream proxy server 102 adds a URLPopularity field to an HTTP response. This field identifies the relative popularity of the URL to other URLs which are being multicast. The URL Popularity field holds an 8 digit unsigned hexadecimal number. The field contains the AgedAccessNumber further discussed below.

6.3.2 Mcast Expiration

The upstream proxy server 102 also adds a McastExpiration header field to an HTTP response. This field contains, like an Expires field, an HTTP-date field. It may also contain 0 which means consider the URL expired. The downstream proxy server 104, 112, 204 uses this field to determine whether to validate its URL cache entry by making a GET IF MODIFIED SINCE request.

7. UPSTREAM PROXY MULTICAST POLICY

It is expected that the upstream proxy server's 102 multicast policy will be improved over time. The implementation of the present invention allows this policy to be enhanced without disrupting the operation of the receiver. The policy described here provides a clear mechanism for reducing overall outbound network utilization.

7.1 URL ADDRESS DATABASE

The upstream proxy server 102, as described earlier, receives from reporting and best effort downstream proxy servers 104, 204 requests for URLs and cache hit reports. The upstream proxy server 102 uses these requests and usage reports to maintain a URL address database. This database contains URL address entries, each of which contains:

URL Address—the URL address itself or a message digest of the address (see the discussion of message digests below).

AgedAccessCounter—a 32-bit unsigned counter which is increased with every request for the-URL and with each usage report for the URL and which is reduced to age out stale entries.

ExpirationTime—holds the GMT time when this URL expires.

The upstream proxy server 102 maintains the AgedAccessCount such that it is an indicator of its URL's popularity, that is, frequency of access by downstream proxy servers 104, 112. The upstream proxy server 102, upon receiving a request or a usage report for a URL, looks up the URL in its database, if found, increases its AgedAccessCount, for example, by 1000. The upstream proxy server 102 creates an entry with the AgedAccessCount initialized to a default initial value (e.g. 1000) if the URL was not found. Periodically, (e.g. hourly), the upstream proxy server 102 reduces each database entry's AgedAccessCount by a configurable amount.(e.g. 10%).

7.2 MESSAGE DIGESTS

As is well known to a practitioner skilled in the art, a message digest (or digest) is a relatively short (e.g. 64 bits), fixed length string of bits which is a function of a variable length string of bits. This function has the property that the message digest of different variable length strings will almost always have different digests. "Almost always" means, in this case, a very low probability (e.g. 1 in $2^{60}$ or one in $10^{18}$). Some message digest functions also have the useful property in cryptographic systems that it is difficult to create a string whose message digest is identical to the message digest of another string. This property is not required for this invention. Message digests are introduced in "Applied Cryptography" by Bruce Schneier. The present invention utilizes message digests to determine when two URL addresses are identical (by checking whether their digests are identical).

7.3 MULTICAST NETWORK UTILIZATION

The upstream proxy server 102 is configured with a maximum multicast outbound bit rate, for example, 6 Mbits/sec. The upstream proxy server 102 manages its multicast transmissions to not exceed this maximum rate. In the preferred embodiment, the upstream proxy server 102 maintains twenty byte counters, one for each tenth of a second. It moves round robin from one counter to the next every tenth of a second. When it multicasts a packet, it adds the size of the packet to the counter. Thus, the upstream proxy server 102 can calculate the average throughput over the last two seconds. From this average throughput, the upstream proxy server 102 can calculate the overall multicast utilization, that is, the average throughput divided by the maximum multicast outbound bit rate.

The upstream proxy server 102 is also configured with a maximum general multicast outbound bit rate, for example, 1 Mbit/sec. The upstream proxy server 102 manages its multicast transmission of general URLs to not exceed this maximum rate. This is done in a fashion similar to overall multicast transmission, the upstream proxy server 102 can calculate its general multicast utilization.

7.4 HTTP RESPONSE EXPIRATION FIELD

The upstream proxy server 102 receives HTTP responses either from a web server 110 or a yet further upstream proxy server (not shown in FIG. 5). Prior to multicasting a URL, the upstream proxy server 102 must ensure that there is an appropriate expiration field in the HTTP response header.

The policy for calculating the expiration is as follows:

1. If any cookies were present in the HTTP request, the response may be specific to the requesting browser and the upstream proxy server 102 sets the Expiration field to 0, indicating already expired. As is well known to those skilled in the art, a cookie is a data item which is provided by a web server to a browser in an HTTP response and is returned to the web server in subsequent HTTP requests. It is typically used to allow the web server to identify the requests which are coming from a single user. A cookie HTTP request header field is shown in the typical request illustrated in FIG. 8.
2. Otherwise, if the expiration field already exists, the upstream proxy server 102 leaves it untouched.
3. Otherwise, the upstream proxy server 102 sets the expiration field based on MIME type. The upstream proxy server 102 is configured with a table giving the expiration duration for various MIME types and a default expiration for all other MIME types. The upstream proxy server 102 takes the current GMT time and adds the appropriate expiration duration to calculate the expiration time. This allows HTML (which is more likely to change) to expire sooner than images (gif and jpg) which are less likely to change).

7.5 MULTICAST DECISION

The upstream proxy server 102 receives HTTP responses either from a web server 110 or a yet further upstream proxy server (not shown in FIG. 5). The upstream proxy server 102 examines the HTTP response header to determine the cachability of the URL.

If it is uncachable and the request came from a reporting downstream proxy server, the upstream proxy server 102 returns the response to the downstream proxy server 104 by its point-to-point connection. If it is cacheable, the upstream proxy server 102 looks up its URL in the URL address database and determines whether to return a response to the downstream proxy server 104, 204 and how that response is returned. A response must be returned to a reporting downstream proxy server 104. The response may be sent either via multicast or via point-to-point connection. A response, if necessary, is returned to a best. effort downstream proxy server 204, via multicast. Multicast responses may either be sent on the general or on a specific multicast address. The preferred embodiment of the present invention may utilize the following algorithm to determine how, if at all, the upstream proxy server returns a response.

1. Determine whether the URL is qualified to be general multicast, multicast on the general address if qualified.

2. If not, determine whether the URL is qualified for specific multicast, multicast on a specific address if qualified.
3. Otherwise, send it point-to-point if the request came from a reporting downstream proxy server. Send no response otherwise.

7.5.1 General Multicast Decision

The general multicast decision is based on whether the URL content is included in the response, the popularity of the URL and the general multicast utilization where as the utilization goes up, the popularity of the URL also must go up for the URL to be qualified to be transmitted.

The URL content is not included in a "not modified" response to a GET IF MODIFIED SINCE request. Such a response is only qualified to be multicast when the corresponding entry in the URL address database is "expired" and the response itself is not expired. A "qualified" response with no URL content is worth multicasting as it may be used to update the expiration time of the corresponding entry in the cache of the downstream proxy servers.

The upstream proxy server 102 is configured with a general multicast decision table. This table contains a set of entries, each entry containing a general multicast utilization threshold and a minimum AgedAccessCount. A URL is qualified for general multicast transmission if there is any entry in the table where the general multicast utilization is less than the general multicast utilization threshold and AgedAccessCount exceeds the minimum AgedAccessCount. To avoid overloading the general multicast maximum bit rate, the table always contains an entry for 100% utilization which requires an infinitely high AgedAccessCount and the table allows no other entries with a utilization of 100% or higher.

7.5.2 Specific Multicast Decision

The specific multicast decision is based on the popularity of the URL and the overall multicast utilization where, as the utilization goes up, the popularity of the URL also must go up for the URL to be qualified to be transmitted.

The upstream proxy server 102 is configured with a specific multicast decision table. This table contains a set of entries, each entry containing a overall multicast utilization threshold and a minimum AgedAccessCount. A URL is qualified for specific multicast transmission if there is any entry in the table where the specific multicast utilization is less than the specific multicast utilization threshold and AgedAccessCount exceeds the minimum AgedAccessCount. To avoid overloading the overall multicast maximum bit rate, the table always contains an entry for 100% utilization which requires an infinitely high AgedAccessCount and the table allows no other entries with a utilization of 100% or higher.

7.5.3 Preferred Site Access To Multicast

It may be desirable to give certain web sites preferred access to the multicast channel. The present invention accommodates this by allowing "preferred" reporting and best effort downstream proxy servers 104, 204 to be configured and to configure the upstream proxy server 102 to preferentially multicast requests from "preferred" reporting and best effort downstream proxy servers 104, 204. The upstream proxy server 102 multicasts all responses to requests coming from a "preferred" downstream proxy server 104, 204, giving the site priority to the multicast bandwidth and queuing the responses until bandwidth is available. A web crawler program, such a Teleport Pro by Tennyson Maxwell (www.tenmax.com) is then programmed to periodically crawl such a preferred web site. This results in the preferred web site's content being periodically multicast. A preferred downstream proxy server 104, 112 can be configured to either have its responses multicast either as general multicasts (for sites which are very much preferred) or as specific multicasts (for sites which are preferred).

8. DOWNSTREAM PROXY CACHING POLICY

8.1 CACHING POLICY OVERVIEW

It is expected that the downstream proxy server's 104, 112, 204 cache policy will also be improved over time. The implementation of the present invention allows this policy to be enhanced without changing the interface to the upstream proxy server 102. The policy described here provides a clear mechanism for reducing overall outbound network utilization.

The cache policy of the preferred embodiment of the present invention is optimized for small-scale operation where the downstream proxy server 104, 112, 204 is supporting either a single browser 128 or a small number of browsers and where these browsers have their own caches. The policy supplements the benefits of a browser cache with most of the benefits of the large-scale cache while consuming a fraction of a large-scale cache's resources.

The cache policy includes four separate operations:
1. determining which multicast addresses to open;
2. determining what to do with URLs received on those addresses;
3. aging cache entries in a fashion identical to the upstream proxy server's URL address database entry aging; and
4. cache lookup.

8.2 MULTICAST ADDRESS POLICY

8.2.1 Multicast Reception Modes

The multicast receiver for the downstream proxy server 104, 112, 204 operates in one of two modes:

active—the downstream proxy server 104, 112, 204 opens multicast addresses and actively processes the received URLs on those addresses.

inactive—the downstream proxy server 104, 112, 204 disables multicast reception from the upstream proxy server 102. In the inactive state the downstream proxy server 104, 112, 204 minimizes its use of resources by, for example, closing the cache and freeing its RAM memory.

For downstream proxy server 104, 112, 204 operating on a general purpose personal computer, the multicast receiver for the downstream proxy server 104, 112, 204 may be configured to switch between the active and inactive states to minimize the proxy server's interfering with user-directed processing. The downstream proxy server 104, 112, 204 utilizes an activity monitor which monitors user input (key clicks and mouse clicks) to determine when it should reduce resource utilization. The downstream proxy server 104, 112, 204 also monitors for proxy cache lookups to determine when it should go active.

Upon boot up, the multicast receiver is inactive. After a certain amount of time with no user interaction and no proxy cache lookups (e.g. 10 minutes), the downstream proxy server 104, 112, 204 sets the multicast receiver active. The downstream proxy server 104, 112, 204 sets the multicast receiver active immediately upon needing to perform a cache lookup The downstream proxy server 104, 112, 204 sets the multicast receiver inactive whenever user activity is detected and the cache has not had any lookups for a configurable period of time (e.g. 5 minutes).

For downstream proxy servers 104, 112, 204 running on systems with adequate CPU resources to simultaneously handle URL reception and other applications, the user may configure the downstream proxy server 104, 112, 204 to set the multicast receiver to stay active regardless of user activity.

8.2.2 Multicast Address Selection

The downstream proxy server 104, 112, 204 is configured to open a configurable number of multicast addresses, for example, 150 addresses. When the downstream proxy server sets the multicast receiver active, the downstream proxy server 104, 112, 204 always opens the general multicast address and the specific multicast addresses for the web sites for which it has outstanding requests to the upstream proxy server 102. It opens the specific addresses corresponding to the most popular domain names in its domain name cache with the remaining address slots. Reporting downstream proxy servers and best effort downstream proxy servers give priority to the domain names of URLs for which they have outstanding HTTP requests open to the upstream proxy server and close specific addresses as needed to make room for the addresses associated with those URLs. The downstream proxy server 104, 112, 204 thus has access to the multicast of the web sites it is most likely, based on past history, to access.

8.2.3 Multicast URL Reception Processing

A downstream proxy server 104, 112, 204 may receive via multicast either a complete HTTP response with the URL content or "not modified" HTTP response header without URL content with an updated McastExpiration field.

The downstream proxy server 104, 112, 204 examines the URL popularity field of a complete HTTP response and removes URLs from the cache until there is room for the URL just received. The downstream proxy server removes URLs beginning with those with the lowest AgedAccessCounter values. The downstream proxy server 104, 112, 204 discards a received URL when there are insufficient URLs whose AgedAccessCounter fields are lower than the URL popularity field of the URL just received to make room for the URL just received. When storing the URL just received in the cache, the downstream proxy server 104, 112, 204 copies the URL popularity field into the cache entry's AgedAccessCount.

Upon receiving a "not modified" HTTP response header without URL content, the downstream proxy server 104, 112, 204 looks up the corresponding URL in its cache. If found, the downstream proxy server updates the cache entry's AgedAccessCounter value with the URL popularity field and updates the entry's expiration field with the response header's McastExpiration field's value.

After updating the cache, a reporting or best effort downstream proxy server 104, 204 checks whether an HTTP request is outstanding to either the webserver or upstream proxy server for the received URL. If so and the URL is now in the cache, the downstream proxy server responds to the requesting browser with the cache entry. If a "not-modified" URL response was received and a request for the URL is outstanding and there was no cache entry the downstream proxy server 104, 204 returns the "not-modified" HTTP response to the browser.

8.2.4 URL Cache Aging

The downstream proxy server 104, 112, 204 ages URLs the same way the upstream proxy 102 ages URLs.

8.2.5 Cache Lookup

When the downstream proxy server 104, 112, 204 looks up a URL in the cache and the URL has not expired, the downstream proxy server 104, 112, 204 returns the URL from the cache to the browser 128. When the URL has expired, the downstream proxy server 104, 112, 204 sends a GET IF MODIFIED SINCE transaction against the upstream proxy server 102 and/or the web server 110 as is appropriate for the category of proxy server receiving the request.

9. CONCLUSION

As set forth above, the present invention offers many significant innovations over prior satellite systems multicast systems by offering lower response time and lower network utilization while limiting the resources required within the satellite receiver and associated equipment needed to achieve these benefits.

Although several embodiments of the present invention have been described above, there are of course numerous other variations that would be apparent to one of ordinary skill in the art. For example, one or more of the downstream proxy servers 104, 112, 204 could reside with the browser 128, 128', 128" on a single personal computer 122, 122', 122". Additionally, one or more of the downstream proxy servers 104, 112, 204 could reside with the browser 128, 128', 128" on a television set-top box. Further, one or more of the downstream proxy servers 104, 112, 204 residing with the browser 128, 128', 128" on a single personal computer 122, may also have a downstream TCP/IP internetwork connection to other browsers which may or may not be operating on personal computers. Also, one or more of the downstream proxy servers 104, 112, 204, residing with a browser 128, 128', 128" on a television set-top box, may also have a downstream TCP/IP internetwork connection to other browsers which may or may not be operating on personal computers. Also, the multicast network 126 need not be based on geosynchronous satellite technology but could be based on any of a number of other multicast technologies including wireless terrestrial broadcast systems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communications system comprising:
    at least one upstream proxy server; and
    at least two reporting downstream proxy servers;
    said at least one upstream proxy server capable of multicasting URLs to said at least two reporting downstream proxy servers;
    said at least two reporting downstream proxy servers interacting with said at least one upstream proxy server to resolve cache misses;
    wherein said at least one upstream proxy server returns at least one resolution to the cache misses via multicast,
    where said at least two reporting downstream proxy servers utilize a relative frequency that a source web server of a multicast URL has had items requested by clients of at least one of said at least two reporting downstream proxy servers to determine whether to store a multicast URL.

2. The communication system of claim 1, where said at least one upstream proxy server returns at least one response to the cache misses via point-to-point transmission.

3. The communication system of claim 2, where said at least two reporting downstream proxy servers send cache hit information to said at least one upstream proxy server.

4. The communication system of claim 3, where said at least two reporting downstream proxy servers piggyback cache hit information on HTTP request headers being sent to said at least one upstream proxy server.

5. The communication system of claim 4, where said at least one upstream proxy server uses relative frequency accesses of the URL including both cache misses and cache hits as reported to the upstream server to help determine whether content of a cache miss is returned via multicast or point-to-point transmission.

6. The communication system of claim 2, where said at least one upstream proxy server uses popularity, where popularity is based on a relative frequency of access of a URL, to determine whether the URL is returned via multicast or point-to-point transmission.

7. The communication system of claim 5, where said at least one upstream proxy server also uses a loading of the multicast channel in combination with the popularity to determine whether the URL is returned via multicast or point-to-point transmission.

8. The communication system of claim 2, where said at least one upstream proxy server maps a domain name of a source of a URL to a multicast address to determine the multicast address to be used to carry the URL.

9. The communication system of claim 8, wherein said at least one upstream proxy server maps domain names to multicast addresses using of a hash function.

10. The communication system of claim 8, wherein URLs with a relatively high popularity are carried on a multicast address dedicated to carrying URLs of general interest.

11. The communication system of claim 1, wherein additional reporting downstream proxy servers which are not currently interacting with said at least one upstream proxy server filter multicast cache resolutions from said at least one upstream proxy server and store a subset of cacheable items for subsequent retrievals upon request, by a client.

12. The communication system of claim 1, wherein additional non-reporting downstream proxy servers which do not report to said at least one upstream proxy server filter multicast cache resolutions from said at least one upstream proxy server and store a subset of cacheable items for subsequent retrieval, upon request, by a client.

13. A communication system comprising:

at least one multicast capable upstream proxy server; and at least two best-effort downstream proxy servers;

said at least one multicast capable upstream proxy server capable of multicasting URLs to said at least two best-effort downstream proxy servers where said at least two best-effort downstream proxy servers interact with said at least one upstream proxy server and either a web-server directly or at least one non-multicast capable proxy server to resolve cache misses;

wherein said at least one multicast capable upstream proxy server returns at least one resolution to the cache misses via multicast; and wherein said at least two best-effort downstream proxy servers relay responses from said at least one multicast capable proxy server to a client when the responses arrive prior to a response from the web server or said at least one non-multicast capable upstream proxy server.

14. The communication system of claim 13, where said at least two best-effort downstream proxy servers use a best-effort communication mechanism to send cache miss resolution requests to said at least one multicast capable upstream proxy server.

15. The communication system of claim 13, where said at least two best-effort downstream proxy servers send cache hit information to said at least one multicast capable upstream proxy server.

16. The communication system of claim 15, where said at least two best-effort downstream proxy servers piggyback cache hit information on HTTP request headers sent to said at least one multicast capable upstream proxy server.

17. An upstream proxy server capable of multicasting URLs to at least two reporting downstream proxy servers;

said upstream proxy server interacting with said at least two reporting downstream proxy servers to resolve cache misses;

wherein said upstream proxy server returns at least one resolution to the cache misses via multicast, where said at least one upstream proxy server returns at least one response to the cache misses via point-to-point transmission, where the upstream proxy server is able to receive cache hit information from at least one downstream proxy server, where the upstream proxy server uses a relative frequency of cache misses and cache hits to an individual server to determine whether content of a cache miss is returned via multicast or point-to-point transmission.

18. The upstream proxy server of claim 17, where the upstream proxy server is able to receive cache hit information from at least one downstream proxy server piggybacked on an HTTP request from said downstream proxy server.

19. The upstream proxy server of claim 17, where the upstream proxy server uses popularity, where popularity is based on a relative frequency of access of a URL, to determine whether the URL is returned via multicast or point-to-point transmission.

20. The upstream proxy server of claim 19, where the upstream proxy server also uses a loading of the multicast channel in combination with the popularity to determine whether the URL is returned via multicast or point-to-point transmission.

* * * * *